(12) United States Patent
DeSilva et al.

(10) Patent No.: US 10,540,645 B2
(45) Date of Patent: Jan. 21, 2020

(54) METHOD AND SYSTEM FOR FACILITATING INSTALLMENTS IN AN ELECTRONIC TRANSACTION

(71) Applicant: MasterCard International Incorporated, Purchase, NY (US)

(72) Inventors: Eugene DeSilva, Greenwich, CT (US); Illya Shell, New York, NY (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 651 days.

(21) Appl. No.: 15/147,261

(22) Filed: May 5, 2016

(65) Prior Publication Data
US 2017/0323280 A1 Nov. 9, 2017

(51) Int. Cl.
*G06Q 20/20* (2012.01)
*G06Q 20/38* (2012.01)
*G06Q 20/42* (2012.01)

(52) U.S. Cl.
CPC ......... *G06Q 20/202* (2013.01); *G06Q 20/389* (2013.01); *G06Q 20/42* (2013.01)

(58) Field of Classification Search
None
See application file for complete search history.

(56) References Cited

U.S. PATENT DOCUMENTS 6,064,987 A * 5/2000 Walker ................. G06Q 10/087
705/30
6,980,968 B1 * 12/2005 Walker ................... G06Q 20/04
705/26.1

(Continued)

FOREIGN PATENT DOCUMENTS

EP 1378844 A2 1/2004

OTHER PUBLICATIONS

International Search Report and Written Opinion issued by the International Search Authority dated Mar. 31, 2016 in corresponding PCT Application No. PCT/US2015/064406 (13 pages).

(Continued)

*Primary Examiner* — Scott A Zare
(74) *Attorney, Agent, or Firm* — Buchanan Ingersoll & Rooney PC

(57) ABSTRACT

A method for facilitation of installments for an electronic transaction includes: receiving a transaction message for an electronic transaction including an account identifier, transaction identifier, transaction date, and transaction amount; storing a transaction record for the transaction including the transaction identifier, transaction amount, transaction date, and a due date based on the transaction date; receiving an installment request, the request including the transaction identifier and installment options; calculating installment terms based on the installment options, transaction amount, transaction date, and due date, wherein the installment terms and/or options including an installment amount and number of installments; generating a plurality of transaction records, each related to an installment including the transaction identifier, installment amount, and a payment date based on the due date and number of installments, the number of transaction records being equivalent to the number of installments; and replacing the transaction record with the generated plurality of transaction records.

24 Claims, 9 Drawing Sheets

(56) References Cited

U.S. PATENT DOCUMENTS

| | | | |
|---|---|---|---|
| 8,523,059 B1* | 9/2013 | Mullen | G06Q 20/204 |
| | | | 235/379 |
| 2011/0238567 A1* | 9/2011 | Ferreira Da Silva | G06O 20/10 |
| | | | 705/39 |
| 2013/0060687 A1* | 3/2013 | Bak | G06Q 20/20 |
| | | | 705/41 |
| 2014/0122338 A1 | 5/2014 | Cueli | |
| 2015/0019426 A1 | 1/2015 | Pacher | |
| 2015/0058143 A1* | 2/2015 | Zeinfeld | G06Q 40/025 |
| | | | 705/16 |

OTHER PUBLICATIONS

International Search Report and Written Opinion issued by the International Search Authority dated Jul. 11, 2017 in corresponding PCT Application No. PCT/US2017/028830 (13 pages).

* cited by examiner

Create New Installment Plan ~ 602

| Date | Merchant | Amount |
|---|---|---|
| ☒ January 1, 2015 | Paper Products, Inc. | $192.85 |
| ☐ January 1, 2015 | Office Supply Co. | $784.91 |
| ☒ January 3, 2015 | Computer Tech Center | $604.54 |
| ☐ January 6, 2015 | Office Services, LLC | $84.99 |

Sub-total: $797.39

Number of Payments: 7
Monthly Payment: $124.37
Initiation Fee: $14.00

Total Cost of Plan: $884.59
~ 604

1 —●———— 12
   ~ 606
   7

( Create Installment )
~ 608

FIG. 6

METHOD AND SYSTEM FOR FACILITATING INSTALLMENTS IN AN ELECTRONIC TRANSACTION

FIELD

The present disclosure relates to the facilitation of installments for an electronic transaction, specifically the creation and processing of installments in place of an electronic transaction for a small business or consumer at an issuing financial institution.

BACKGROUND

For many entities, transaction accounts that enable the associated entity to purchase an item first, and then pay for the item later on in the future can be beneficial. For example, small businesses may find such payment schemes very useful, such as a retailer purchasing an item wholesale and selling the item at a mark-up to a consumer, where they can receive the payment from the consumer for the marked-up amount prior to actually owing the purchase amount for the item.

Another payment scheme for delayed payment of an item is the use of installments. In such systems, when purchasing an item from a merchant, the purchaser can choose to pay for the item via a series of installment payments over a period of time, rather than pay for the item outright. Such installment payments often total to an amount greater than the initial purchase price, due to interest, as an incentive to the merchant, while still enabling the purchase to receive the item immediately and pay for it slowly over time.

However, many merchants may be unable to offer installment payments as an option, particularly in a large number of countries where financial payment systems lack the hardware and programming to accommodate such transactions. Thus, an entity, such as a small business or an individual consumer, may be unable to use installments in many instances, and may instead have to take advantage of other delayed payment schemes. However, many of these methods provide for delayed payment of periods as low as thirty or sixty days.

Thus, there is a need for a technical solution to enable an entity, such as a small business or consumer, to make a series of delayed payments for an electronic payment transaction, without the need to rely on merchants and acquiring financial institutions that often lack the hardware infrastructure and programming necessary to process such transactions. As every transaction for a transaction account for an entity involves a single issuing financial institution, technological improvements to systems associated with an issuing financial institution, as discussed herein, may enable entities to purchase products and have immediate access, and yet make delayed payments for the particular purchase over a long-term period of time.

SUMMARY

The present disclosure provides a description of systems and methods for the facilitation of installments for an electronic transaction.

A method for facilitation of installments for an electronic transaction includes: storing, in an account database of a processing server, an account profile, wherein the account profile includes a standardized data set related to a transaction account including at least an account identifier; receiving, by a receiving device of the processing server, a transaction message related to an electronic transaction involving the transaction account from a payment network, wherein the transaction message is formatted based on one or more standards and includes a plurality of data elements including at least a first data element configured to store the account identifier, a second data element configured to store a transaction identifier, a third data element configured to store a transaction date, and a fourth data element configured to store a transaction amount; storing, in a record database of the processing server, a transaction record, wherein the transaction record includes a standardized data set related to the electronic transaction including at least the transaction identifier, the transaction amount, the transaction date, and a due date based on the transaction date; receiving, by the receiving device of the processing server, a data signal superimposed with an installment request, the installment request including at least data identifying the transaction account, the transaction identifier, and one or more installment options; calculating, by an installment calculation module of the processing server, one or more installment terms based on at least one of: the one or more installment options, the transaction amount, the transaction date, and the due date, wherein the one or more installment terms and/or one or more installment options includes at least an installment amount and a number of installments; generating, by an installment generation module of the processing server, a plurality of transaction records, wherein each transaction record includes a standardized data set related to an installment for the electronic transaction including at least the transaction identifier, the installment amount, and a payment date based on the due date and the number of installments, and wherein a number of transaction records in the plurality of transaction records is equivalent to the number of installments; and replacing, by an updating module of the processing server, the transaction record stored in the record database with the generated plurality of transaction records.

A system for facilitation of installments for an electronic transaction includes: an account database of a processing server configured to store an account profile, wherein the account profile includes a standardized data set related to a transaction account including at least an account identifier; a receiving device of the processing server configured to receive a transaction message related to an electronic transaction involving the transaction account from a payment network, wherein the transaction message is formatted based on one or more standards and includes a plurality of data elements including at least a first data element configured to store the account identifier, a second data element configured to store a transaction identifier, a third data element configured to store a transaction date, and a fourth data element configured to store a transaction amount; a record database of the processing server configured to store a transaction record, wherein the transaction record includes a standardized data set related to the electronic transaction including at least the transaction identifier, the transaction amount, the transaction date, and a due date based on the transaction date; and an installment calculation module, an installment generation module, and an updating module of the processing server. The receiving device of the processing server is further configured to receive a data signal superimposed with an installment request, the installment request including at least data identifying the transaction account, the transaction identifier, and one or more installment options, The installment calculation module of the processing server is configured to calculate one or more installment terms based on at least one of: the one or more installment options, the transaction amount, the transaction date, and the due date, wherein the one or more installment terms and/or one or more installment options includes at least an installment amount and a number of installments. The installment generation module of the processing server is configured to generate a plurality of transaction records, wherein each transaction record includes a standardized data set related to an installment for the electronic transaction including at least the transaction identifier, the installment amount, and a payment date based on the due date and the number of installments, and wherein a number of transaction records in the plurality of transaction records is equivalent to the number of installments. The updating module of the processing server is configured to replace the transaction record stored in the record database with the generated plurality of transaction records.

BRIEF DESCRIPTION OF THE DRAWING FIGURES

The scope of the present disclosure is best understood from the following detailed description of exemplary embodiments when read in conjunction with the accompanying drawings. Included in the drawings are the following figures:

FIG. 6 is a diagram illustrating a graphical user interface for the facilitation of an installment for multiple payment transactions and the selection of installment options in accordance with exemplary embodiments.

Figure 1:
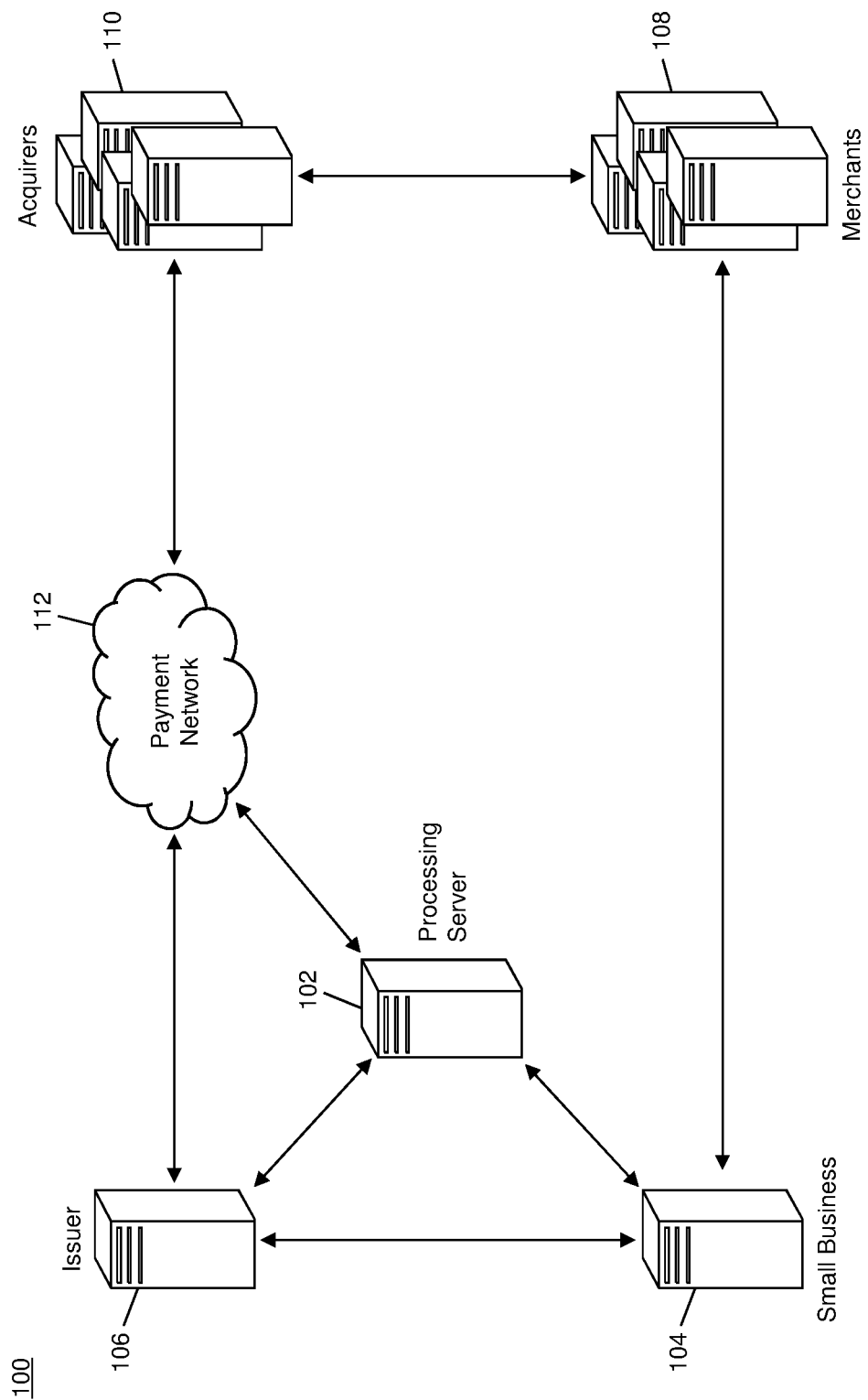
FIG. 1 is a block diagram illustrating a high level system architecture for the facilitation of installments at the issuing financial institution for an electronic transaction in accordance with exemplary embodiments.

Further areas of applicability of the present disclosure will become apparent from the detailed description provided hereinafter. It should be understood that the detailed description of exemplary embodiments are intended for illustration purposes only and are, therefore, not intended to necessarily limit the scope of the disclosure.

DETAILED DESCRIPTION

Glossary of Terms

Payment Network—A system or network used for the transfer of money via the use of cash-substitutes. Payment networks may use a variety of different protocols and procedures in order to process the transfer of money for various types of transactions. Transactions that may be performed via a payment network may include product or service purchases, credit purchases, debit transactions, fund transfers, account withdrawals, etc. Payment networks may be configured to perform transactions via cash-substitutes, which may include payment cards, letters of credit, checks, transaction accounts, etc. Examples of networks or systems configured to perform as payment networks include those operated by MasterCard®, VISA®, Discover®, American Express®, PayPal®, etc. Use of the term "payment network" herein may refer to both the payment network as an entity, and the physical payment network, such as the equipment, hardware, and software comprising the payment network.

Transaction Account—A financial account that may be used to fund a transaction, such as a checking account, savings account, credit account, virtual payment account, line of credit, etc. A transaction account may be associated with a consumer, which may be any suitable type of entity associated with a payment account, which may include a person, family, company, corporation, governmental entity, etc. In some instances, a transaction account may be virtual, such as those accounts operated by PayPal®, etc.

Merchant—An entity that provides products (e.g., goods and/or services) for purchase by another entity, such as a consumer or another merchant. A merchant may be a consumer, a retailer, a wholesaler, a manufacturer, or any other type of entity that may provide products for purchase as will be apparent to persons having skill in the relevant art. In some instances, a merchant may have special knowledge in the goods and/or services provided for purchase. In other instances, a merchant may not have or require and special knowledge in offered products. In some embodiments, an entity involved in a single transaction may be considered a merchant. In some instances, as used herein, the term "merchant" may refer to an apparatus or device of a merchant entity.

Acquirer—An entity that may process payment card transactions on behalf of a merchant. The acquirer may be a bank or other financial institution authorized to process payment card transactions on a merchant's behalf. In many instances, the acquirer may open a line of credit with the merchant acting as a beneficiary. The acquirer may exchange funds with an issuer in instances where a consumer, which may be a beneficiary to a line of credit offered by the issuer, transacts via a payment card with a merchant that is represented by the acquirer.

Issuer—An entity that establishes (e.g., opens) a letter or line of credit in favor of a beneficiary, and honors drafts drawn by the beneficiary against the amount specified in the letter or line of credit. In many instances, the issuer may be a bank or other financial institution authorized to open lines of credit. In some instances, any entity that may extend a line of credit to a beneficiary may be considered an issuer. The line of credit opened by the issuer may be represented in the form of a payment account, and may be drawn on by the beneficiary via the use of a payment card. An issuer may also offer additional types of payment accounts to consumers as will be apparent to persons having skill in the relevant art, such as debit accounts, prepaid accounts, electronic wallet accounts, savings accounts, checking accounts, etc., and may provide consumers with physical or non-physical means for accessing and/or utilizing such an account, such as debit cards, prepaid cards, automated teller machine cards, electronic wallets, checks, etc. In some instances, as used herein, the term "issuer" may refer to an apparatus or device of an issuer entity.

Payment Transaction—A transaction between two entities in which money or other financial benefit is exchanged from one entity to the other. The payment transaction may be a transfer of funds, for the purchase of goods or services, for the repayment of debt, or for any other exchange of financial benefit as will be apparent to persons having skill in the relevant art. In some instances, payment transaction may refer to transactions funded via a payment card and/or payment account, such as credit card transactions. Such payment transactions may be processed via an issuer, payment network, and acquirer. The process for processing such a payment transaction may include at least one of authorization, batching, clearing, settlement, and funding. Authorization may include the furnishing of payment details by the consumer to a merchant, the submitting of transaction details (e.g., including the payment details) from the merchant to their acquirer, and the verification of payment details with the issuer of the consumer's payment account used to fund the transaction. Batching may refer to the storing of an authorized transaction in a batch with other authorized transactions for distribution to an acquirer. Clearing may include the sending of batched transactions from the acquirer to a payment network for processing. Settlement may include the debiting of the issuer by the payment network for transactions involving beneficiaries of the issuer. In some instances, the issuer may pay the acquirer via the payment network. In other instances, the issuer may pay the acquirer directly. Funding may include payment to the merchant from the acquirer for the payment transactions that have been cleared and settled. It will be apparent to persons having skill in the relevant art that the order and/or categorization of the steps discussed above performed as part of payment transaction processing.

System for Facilitation of Installments at an Issuer

FIG. 1 illustrates a system 100 for the facilitation of installments for an electronic payment transaction at an issuing financial institution associated with a transaction account used to fund the electronic transaction.

The system 100 may include a processing server 102. The processing server 102, discussed in more detail below, may be configured to facilitation the creation and use of installments for electronic payment transactions for small businesses 104 and other entities, such as individual consumers, as buyers of electronic payment transactions. The small business 104 may have a transaction account with an issuer 106 that may be used to fund a payment transaction. The issuer 106 may be a financial institution, such as an issuing bank, or other entity configured to manage and process transaction accounts for use in funding payment transactions. As used herein, issuer may refer to the issuing financial institution as an entity as well as computing systems and devices of the issuer 106 used in performance of the functions disclosed herein.

The small business 104 may use the transaction account to fund payment transactions involving the small business 104 and merchants 108. The transaction account may be any type of transaction account suitable for funding payment transactions, which may be converted to installments using the methods and systems discussed herein, such as a debit account, credit account, checking account, savings account, line of credit, etc. The small business 104 may provide payment details associated with the transaction account to a merchant 108 for use in a payment transaction via any suitable method. For instance, the small business 104 may provide a payment instrument to the merchant 108, such as a credit card, that is encoded with payment details that may be read by a computing device or system of the merchant 108. For example, the merchant 108 may have a point of sale device configured to read payment details encoded in a magnetic stripe of a payment card, stored in an integrated circuit chip of a payment card, electronically transmitted from a mobile computing device via near field communication, electronically transmitted from a computing device via a network, such as the Internet, etc.

As part of processing of the payment transaction, merchants 108, via computing systems associated therewith, such as point of sale systems, may transmit transaction details for payment transactions involving the small business 108 to an associated acquirer 110. The acquirer 110 may be a financial institution, such as an acquiring bank, configured to manage and process transaction accounts for merchants 108 for use in payment transactions, such as for the receipt of funds associated with payment transactions involving the small business 104. The merchants 108 may transmit the transaction details to the acquirer 110 via the payment rails, discussed in more detail below with respect to the process 800 illustrated in FIG. 8. The computing systems, such as the point of sale systems, may be particularly configured to communicate via the payment rails. The transaction details may be electronically transmitted directly to the acquirer 110 in a data format specified by the acquirer 110, or via one or more intermediate entities, such as a gateway processor, in a data format specified thereby, as further described in the description of FIG. 8.

The acquirers 110 may receive transaction details from associated merchants 108 for payment transactions involving the small business 104, and may generate a transaction message for each transaction for use in processing the related payment transaction. A transaction message may be a data message formatted pursuant to one or more standards governing the exchange of transaction messages for use in payment transactions, such as the International Organization for Standardization's ISO 8583 standard. The transaction message may include a plurality of data elements configured to store data as set forth in the associated standard(s), such as a data element configured to store an account identifier (e.g., a primary account number) associated with the transaction account used to fund the payment transaction, a data element configured to store a transaction identifier unique to the related payment transaction, a data element configured to store a date on which the transaction is conducted, a data element configured to store a transaction amount, and one or more additional data elements configured to store additional data associated with the payment transaction, such as a time, geographic location, point of sale data, authentication information, consumer data, merchant data, offer data, reward data, loyalty data, etc. Transaction messages may also include additional data, such as a message type indicator indicating a type of the transaction message, and an addendum that may be configured to store additional data that may not be specified by the associated standard(s). In some embodiments, transaction messages generated by the acquirer 110 may include a message type indicator indicative of an authorization request.

The acquirers 110 may electronically transmit transaction messages generated for payment transactions to a payment network 112 for processing. The transaction messages may be electronically transmitted via the payment rails and may be superimposed on data signals suitable for transmission thereof. The payment network 112 may be configured to process payment transactions as discussed in more detail below with respect to the process 800 illustrated in FIG. 8. As part of the processing of payment transactions, the payment network 112 may forward transaction messages submitted by the acquirers 110 to the issuer 106 associated with the transaction account (e.g., of the small business 104) used to fund the payment transaction. The issuer 106 may determine if the transaction should be approved or denied, such as based on an available credit limit or balance of the transaction account and other suitable criteria, and may return the transaction message to the payment network 112 with a data element configured to store a response code that is indicative of the determination of approval or denial of the payment transaction. The payment network 112 may forward the transaction message including the response code to the associated acquirer 110 via the payment rails, which may notify the merchant 108 of the response, with the merchant 108 finalizing the transaction accordingly.

In the system 100, the processing server 102 may be configured to facilitate installments for payment transactions involving the small business 104. In some embodiments, the processing server 102 may be a part of the issuer 106. In other embodiments, the processing server 102 may be a part of the payment network 112. In additional embodiments, the processing server 102 may be external to the issuer 106 and payment network 112. The processing server 102 may receive transaction messages for payment transactions involving the small business 104 from the payment network 112, issuer 106, and/or acquirer 110. In some embodiments, the processing server 102 may be configured to receive the transaction messages via the payment rails. In other embodiments, the processing server 102 may receive transaction messages via alternative communication networks, such as the Internet, local area networks, wireless area network, radio frequency networks, cellular communication networks, etc.

The processing server 102 may be configured to store (e.g., in a memory device thereof) transaction records for received transaction messages. Each transaction record may be configured to store data associated with the related payment transaction as included in the corresponding transaction message, such as the transaction identifier, transaction amount, and a transaction date. The transaction record may also include a due date, which may be based on at least the transaction date. For instance, the due date may be a set period of time after the transaction date, such as thirty or sixty dates, at which time the small business 104 associated with the transaction account involved in the payment transaction must pay the issuer 106, acquirer 110, or merchant 108 for the payment transaction. In some embodiments, the transaction record may include and/or may be comprised of the related transaction message.

In some embodiments, transaction records may correspond to payment transactions that have been cleared and settled (e.g., payment provided from the issuer 106 to the acquirer 110 for the payment transaction). In other embodiments, transaction records may correspond to payment transactions that have been cleared but not settled (e.g., where the acquirer 110 has not received payment). In such embodiments, the small business 104 may pay for the payment transaction by the due date by providing payment directly to the acquirer 110, or to the issuer 106, which may provide payment separately to the acquirer 110.

The processing server 102 may be configured to facilitate the creation of installments for payment transactions for which payment by the small business 104 is outstanding. In an exemplary embodiment, installments may be created for payment directly to the issuer 106. In instances where corresponding payment transaction has not settled, the creation of the installment may prompt payment for the transaction amount to the acquirer 110 from the issuer 106, with installment payments being made from the small business 104 to the issuer 106.

To initiate the creation of an installment, the processing server 102 may receive a data signal via a suitable communication network that is superimposed with an installment request. The installment request may include at least a transaction identifier corresponding to the payment transaction to be converted into an installment, data identifying the transaction account involved in the payment transaction, and one or more installment options. The data identifying the transaction account may be the account identifier associated with the transaction account and included in the transaction message corresponding to the payment transaction, or may be different data indicative thereof, such as a reference number or other suitable type of identifier, such as username, e-mail address, phone number, device identifier, or other identifier that may be uniquely associated with a transaction account. Installment options may include, for example, a number of installments, installment amount, interest rate, annual percentage rate, total payment amount, installment period, total payment period, associated fees, etc.

Data signals superimposed with installment requests may be electronically transmitted to the processing server 102 from the small business 104, such as via a computing device suitable for the transmission thereof, such as a desktop computer, laptop computer, notebook computer, tablet computer, cellular phone, smart phone, smart watch, wearable computing device, implantable computing device, etc., or from the issuer 106. In the latter instance, the small business 104 may electronically transmit a data signal to the issuer 106 indicating the intention to create an installment of a payment transaction, which the issuer 106 may receive and then electronically transmit the installment request to the processing server 102.

The processing server 102 may be configured to convert a payment transaction to an installment transaction based on the received installment request. The processing server 102 may identify a transaction record that corresponds to the installment request based on inclusion of the transaction identifier in the transaction record that corresponds to the transaction identifier included in the installment request. The processing server 102 may calculate one or more installment terms based on the data included in the transaction record and/or the installment request. For example, the processing server 102 may calculate an installment amount based on a number of installments included in the installment request and the transaction amount stored in the transaction record. The installment terms may be equivalent to the installment options, but as calculated by the processing server 102 rather than requested by the small business 104. For instance, the installment terms may include a number of installments, installment amount, total payment amount, installment period, total payment period, interest rate, annual percentage rate, associated fees, etc. In some instances, an installment term may replace an installment option, such as instances where the small business 104 may request an installment option that may be overridden by the processing server 102. For example, the small business 104 may request a specific interest rate for the installment that may be denied by the issuer 106, such as based on issuer preferences stored within the processing server 102 as provided by the issuer 106, with the issuer 106 providing an alternative interest rate. In such instances, the processing server 102 may contact the issuer 106 (e.g., via the transmitting of a data signal to the issuer 106 via a suitable communication network) for the calculation of installment terms. In other instances, the issuer 106 may provide preferences to the processing server 102 (e.g., via electronic transmission of a data signal with preference data superimposed thereon) that includes preferences, algorithms, rules, etc. regarding the calculation of installment terms, such as interest rate preferences, installment amount preferences, number of installment preferences, algorithms for calculating a desired interest rate, etc.

Once installment terms have been calculated, the processing server 102 may generate a plurality of transaction records corresponding to the requested installment. Each transaction record may correspond to an installment payment to be made by the small business 104 to the issuer 106 and include at least the transaction identifier associated to the original payment transaction, an installment amount, and a payment date. The installment amount may be the same for each transaction record, or may be different, such as in installments where the installment amount may vary over time, such as may be set by the small business 104 in the installment options or calculated by the processing server 102 in the installment terms. The payment date may be based on the due date in the transaction record corresponding to the original payment transaction and the number of installments and an installment period. For example, the transaction records may include a payment date once a month, twice a month, etc., for a suitable period as may be set by the small business 104 and/or issuer 106.

The processing server 102 may replace the transaction record corresponding to the original payment transaction with the plurality of transaction records generated for the installment. In embodiments where the processing server 102 may be external to the issuer 106, the processing server 102 may electronically transmit one or more data signals superimposed with the plurality of transaction records corresponding to the installment. In some instances, a single data signal may be generated superimposed with each of the plurality of transaction records. In other instances, the processing server 102 may separate the plurality of transaction records into multiple data signals, such as a single data signal for each transaction record.

The issuer 106 may receive the data signal(s) superimposed with the transaction records and may use the transaction records in charging the small business 104 for the corresponding installment amounts. In instances where the original payment transaction has not settled, the issuer 106 may pay the original transaction amount (e.g., in a payment transaction processed via the payment network 112 using traditional methods and systems, such as discussed below with respect to the process 700 illustrated in FIG. 7) to the acquirer 110. The issuer 106, processing server 102, or small business 104 may initiate a payment transaction for payment of an installment amount to the issuer 106 prior to the associated payment date. In such instances, the payment transaction for the installment amount may be processed using traditional methods and systems, such as discussed below, for the installment amount paid to the issuer 106 from the small business 104. In instances where the small business 104 may use a transaction account established with the issuer 106 for payment, the small business 104 or processing server 102 may electronically transmit a data signal to the issuer 106 that is superimposed with a payment request indicating the transaction account used to make the payment and the transaction identifier and/or installment amount for the installment. The issuer 106 may then deduct the installment amount from the transaction account and clear the transaction record for the installment.

In some embodiments, the processing server 102 may be configured to prompt the small business 104 or other associated entity for conversion of the payment transaction into an installment. In such embodiments, when a transaction message is received from the issuer 106 that indicates that the payment transaction is approved, the processing server 102 may electronically transmit a data signal to the small business 104 that is superimposed or otherwise encoded with an installment notification. The installment notification may indicate to the small business 104 that the payment transaction is available for conversion to an installment, and may include information identifying the transaction account and the transaction identifier, and may also include one or more installment terms for use by the small business 104 in the selection of installment terms. The small business 104 may then respond to the received installment notification with the installment request, which may be used by the processing server 102 in generating the corresponding installment records.

In some instances, the installment notification may be electronically transmitted to a computing device associated with the small business 104 or other entity involved in the payment transaction. The computing device may be any type of computing device suitable for performing the functions discussed herein, such as a desktop computer, laptop computer, notebook computer, tablet computer, cellular phone, smart phone, smart watch, smart television, wearable computing device, implantable computing device, etc. Transmissions between the processing server 102 and computing device may be made using any suitable communication method (e.g., email, short messaging service, multimedia messaging service, push notification, etc.) via any suitable communication network (e.g., local area network, wireless area network, the Internet, radio frequency network, cellular communication network, Bluetooth, etc.).

In some embodiments, the processing server 102 may generate an installment for multiple payment transactions. In such embodiments, the installment options and/or terms may be based on the transaction amount and additional data in the transaction records corresponding to each of the multiple payment transactions. In such an instance, the small business 104 may be able to pay a single installment payment each period to the issuer 104 for delayed payment of each of the multiple payment transactions.

In some instances, the processing server 102 may also be configured to provide benefits to the small business 104 in instances where a payment is made earlier rather than the payment transaction converted into an installment. For instance, as discussed in more detail below, the processing server 102 or the issuer 106 may provide a rewards system to the small business 104 in conjunction with the transaction account. In such an instance, the small business 104 may accumulate reward points or other value based on the conducting and payment of payment transactions using the transaction account. The processing server 102 and/or issuer 106 may be configured to provide additional reward value in instances where the small business 104 submits payment for a payment transaction ahead of the due date included in the associated transaction record. In some instances, the reward value may be increased based on a length of time the payment is made ahead of the due date. In some cases, a reward value may not be rewarded to the small business 104 if a payment transaction is converted into an installment. Reward points may be stored and managed by the processing server 102 using methods and systems that will be apparent to persons having skill in the relevant art. In some instances, rewards may be managed by the issuer 106, with the processing server 102 communicating (e.g., via a data signal transmitting using a suitable communication network) reward value information for payment transactions based on data associated therewith.

In some embodiments, the processing server 102 may be configured to convert a payment transaction funded with a first transaction account into an installment transaction funded via a second transaction account. For example, the payment transaction may be funded using a first payment account as indicated via the account identifier stored in the corresponding transaction message. The installment request submitted by the small business 104 may include data associated with a second transaction account that may also be associated with the small business 104 for use in payment of the converted installment. In some instances, the second transaction account may also be associated with the issuer 106, or may be associated with a different financial institution and linked to the small business at the processing server 102 using methods that will be apparent to persons having skill in the relevant art. In such embodiments, the transaction records generated for the installment payments may include account identifiers associated with the second transaction account such that the corresponding installment payments are funded via the second transaction account. In some such instances, the issuer 106 may be notified that the payment transaction is no longer funded via the first transaction account, and the issuer 106 or other financial institution may be notified of the installment payments from the second transaction account.

In some instances, the first and second transaction accounts may be the same type. In other instances, the transaction accounts may be different account types. For example, the payment transaction may be funded via a debit account, where the full transaction amount is debited from the transaction account upon usage. The small business 104 may submit an installment request for conversion of the payment transaction to an installment funded via a credit account. The processing server 102 may initiate the refunding of the transaction amount to the debit account, and may generate the installment records for payment of installments from the credit account.

In some embodiments, the small business 104 or other entity may also be able to change the transaction account used to fund the installment transaction during the course of repayment. In such an embodiment, the small business 104 may submit a request to the processing server 102 that indicates the desire to use an alternative transaction account in future installment payments. The processing server 102 may verify the small business's ability to use the alternative transaction account using standard authentication processes, and may replace the transaction account information (e.g., account identifier) in the remaining installment records with information associated with the alternative transaction account. In such embodiments, the small business 104 may be able to change payments for the installment from a first account to a second, which may be a transaction account of a different type (e.g., from debit to credit) or of the same type.

In some embodiments, the processing server 102 may also be configured to facilitate early repayment of the installment transaction. Early repayment may be the repayment of the entirety of the remaining balance of the installment transaction, or repayment of a portion of the remaining balance. In instances where the remaining balance is repaid entirely, the processing server 102 may initiate the payment of the remaining balance to the to the issuer 106 and may cancel, delete, or otherwise update the remaining installment records. In instances where only a portion of the remaining balance is paid early, the processing server 102 may cancel, delete, or otherwise update a number of installment records where the corresponding installment amounts total to be equivalent to the repaid amount. In some such instances, the installment records having the latest payment dates may be cancelled, such that the overall time for repayment is accelerated as a result of the early payment.

The methods and systems discussed herein may provide for a technical improvement to issuing financial institutions by way of the processing server 102 converting payment transactions into installments at an issuer 106 for payment of a payment transaction over time. By providing installment payments to the issuer 106 associated with a transaction account rather than an acquirer 110 associated with a transaction, as in traditional systems, a small business 104 may be able to pay installments for any transaction without modification to merchant 108 and acquirer 110 systems. In addition, the technological improvements to the issuer 106 systems via the processing server 102 as discussed herein may enable the issuer 106 to provide for installments for payment transactions based on transaction messages associated with payment transactions that may result in increased revenue with small business 104 via interest related to installments, in addition to further revenue that may be received as a result of increased use of the transaction account via the installment transactions and other benefits.

Processing Server

Figure 2:
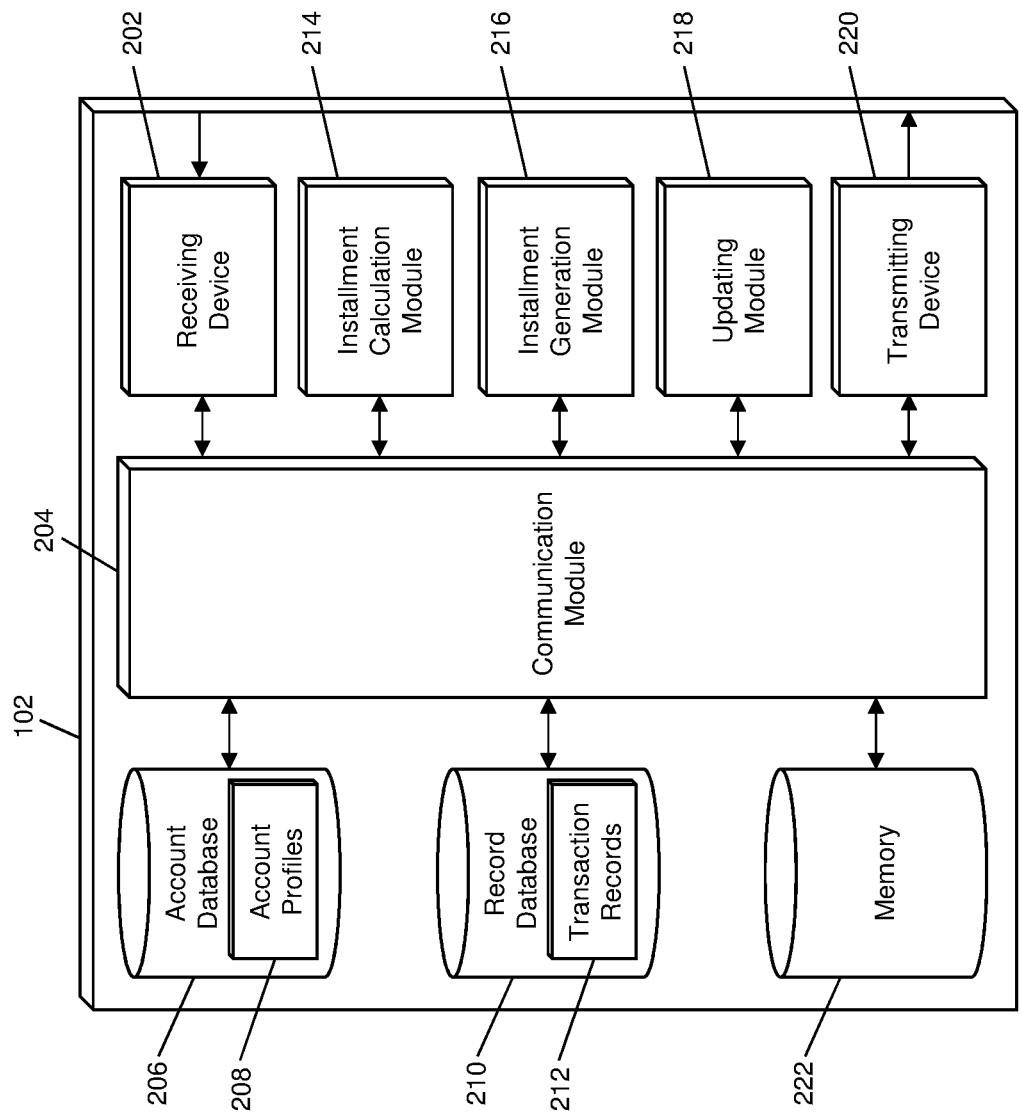
FIG. 2 is a block diagram illustrating the processing server of FIG. 1 for the facilitating of installments for an electronic transaction in accordance with exemplary embodiments.

FIG. 2 illustrates an embodiment of the processing server 102 of the system 100. It will be apparent to persons having skill in the relevant art that the embodiment of the processing server 102 illustrated in FIG. 2 is provided as illustration only and may not be exhaustive to all possible configurations of the processing server 102 suitable for performing the functions as discussed herein. For example, the computer system 900 illustrated in FIG. 9 and discussed in more detail below may be a suitable configuration of the processing server 102.

The processing server 102 may include a receiving device 202. The receiving device 202 may be configured to receive data over one or more networks via one or more network protocols. In some embodiments, the receiving device 202 may be configured to receive data over the payment rails, such as using specially configured infrastructure associated with payment networks 112 for the transmission of transaction messages that include sensitive financial data and information. In some instances, the receiving device 202 may also be configured to receive data from small businesses 104, issuers 106, acquirers 110, payment networks 112, and other entities via alternative networks, such as the Internet. In some embodiments, the receiving device 202 may be comprised of multiple units, such as different receiving devices for receiving data over different networks, such as a first receiving device for receiving data over payment rails and a second receiving device for receiving data over the Internet. The receiving device 202 may receive electronically data signals that are transmitted, where data may be superimposed on the data signal and decoded, parsed, read, or otherwise obtained via receipt of the data signal by the receiving device 202. In some instances, the receiving device 202 may include a parsing module for parsing the received data signal to obtain the data superimposed thereon.

The receiving device 202 may be configured to receive data signals superimposed with transaction messages from the payment network 112 via the payment rails. The transaction messages may be formatted based on one or more standards, such as the ISO 8583 standard, and include a plurality of data elements including a first data element configured to store an account identifier associated with a transaction account involved in the related payment transaction, a second data element configured to store a transaction identifier, a third data element configured to store a transaction date, and a fourth data element configured to store a transaction amount. The receiving device 202 may be configured to receive a data signal electronically transmitted from the small business 104 or issuer 106 superimposed with an installment request. The installment request may include at least data identifying the transaction account for which a payment transaction is to be converted into an installment, the transaction identifier of the payment transaction to be converted, and one or more installment options. The data identifying the transaction account may be the account identifier (e.g., a primary account number for the transaction account) or other data that may be suitable for use by the issuer 106 and/or processing server 102 in identifying the associated transaction account. The installment options may include, for example, a number of installments, installment amount, interest rate, annual percentage rate, installment period, total payment period, total payment amount, associated fees, etc. In some instances, an installment request may include multiple transaction identifiers, such as for instances where multiple payment transactions may be converted into a single installment.

The receiving device 202 may also be configured to receive data signals from the small business 104 or issuer 106 via a suitable communication network superimposed with payment requests. The payment request may include payment details and a transaction identifier corresponding to an installment transaction, for which the small business 104 is providing payment. The payment details may include data suitable for use in processing a payment transaction to be funded by a transaction account associated with the payment details, such as an account number, application cryptograms, and other data, or may be data suitable for use in identifying a transaction account for the providing of payment details. For example, the payment details may include data identifying the transaction account to be used, such that the data may be provided to the issuer 106, which may identify the transaction account accordingly for deduction of the installment amount or use in a payment transaction.

The processing server 102 may also include a communication module 204. The communication module 204 may be configured to transmit data between modules, engines, databases, memories, and other components of the processing server 102 for use in performing the functions discussed herein. The communication module 204 may be comprised of one or more communication types and utilize various communication methods for communications within a computing device. For example, the communication module 204 may be comprised of a bus, contact pin connectors, wires, etc. In some embodiments, the communication module 204 may also be configured to communicate between internal components of the processing server 102 and external components of the processing server 102, such as externally connected databases, display devices, input devices, etc.

The processing server 102 may also include a processing device. The processing device may be configured to perform the functions of the processing server 102 discussed herein as will be apparent to persons having skill in the relevant art. In some embodiments, the processing device may include and/or be comprised of a plurality of engines and/or modules specially configured to perform one or more functions of the processing device. For example, as illustrated in FIG. 2, the processing server 102 may include an installment calculation module 214, installment generation module 216, and an updating module 218, which may comprise a processing device of the processing server 102, such as may be incorporated in one or more processors having one or more processor cores. In some instances, the modules may be implemented using a combination of hardware (e.g., of the processor) and software, which may comprise application programs having program code stored in the processing server 102 and executed by a processor. It will be apparent to persons having skill in the relevant art that the processing server 102 may include additional modules and/or engines suitable for performing the functions discussed herein, such as a parsing module for parsing data signals received by the receiving device 202 into usable data (e.g., into a module for processing such data), a transaction processing module for initiating and/or processing payment transactions, etc.

The processing server 102 may also include an account database 206. The account database 206 may be configured to store a plurality of account profiles 208 using a suitable data storage format and schema. Each account profile 208 may include a standardized data set (e.g., such that the data included in each account profile 208 is standardized to one another) of data related to a transaction account, which may include at least an account identifier associated with the transaction account. The account identifier may be a unique value suitable for use in the identification of the related transaction account and/or the respective account profile 208, such as an account number, identification number, registration number, username, e-mail address, phone number, etc. In some embodiments, an account profile 208 may include multiple account identifiers. In such embodiments, multiple account identifiers may be associated with the related transaction account, such as including an account number for use in payment transactions for the related transaction account as well as an identification number for use in identification in data messages transmitted to and from the small business 104 and other entities for which transmission of the real account number may not be desired. In some embodiments, an account profile 208 may further include data associated with the related transaction account, such as account identifiers for related accounts (e.g., other transaction accounts associated with the small business 104), installment preferences, account balances, account credit limits, reward points, etc. In some cases, an account profile 208 may also include data suitable for use in communicating with one or more computing devices associated with the related transaction account, such as a device identifier associated with an associated computing device and/or communication details.

The processing server 102 may further include a record database 210. The record database 210 may be configured to store a plurality of transaction records 212 using a suitable data storage format and schema. Each transaction record 212 may be configured to store a standardized data set of data related to an electronic payment transaction, including at least the transaction identifier, transaction amount, and transaction date stored in the corresponding data elements included in the transaction message for the related payment transaction, and a due date. The due date may be based on the transaction date, and may, in some instances, be calculated by a specially configured module of the processing server 102 for the calculation thereof. For instance, the specially configured module may receive transaction date information and may calculate, based upon the transaction data and a predetermined period of time thereafter, the due date. The predetermined period of time may be a default period of time, a period of time set by the issuer, may be specific to a type of transaction, etc. The predetermined period may be stored within a database and identified by the module for use in the calculation based upon certain criteria. The due date may be, for example, a predetermined period of time after the transaction date, the next date in a period of dates (e.g., last day of the month), etc., and may be based on criteria set forth by the issuer 106 associated with the related transaction account, the small business 104, or other suitable entity. For example, the issuer 106 and small business 104 may have an agreement that provides sixty days for payment for payment transactions, which may be indicated in the account profile 208 related to the transaction account and used in the calculation of the due date for the transaction record 212.

When an installment request is received by the receiving device 202 from the small business 104 or issuer 106 and parsed, a querying module of the processing server 102 may be configured to execute a query on the record database 210 to identify the transaction record 212 associated with the payment transaction for which the installment is requested. The querying module may receive the data used for identification as input, such as the transaction identifier parsed from the installment request, execute the query on the appropriate database (e.g., the record database 210), and output the identified data, which may be the identified transaction record 212. In some embodiments, the querying module may also execute a query on the account database 206 to identify an account profile 208 associated with the received installment request, using the account identification data parsed therefrom.

The installment calculation module 214 may be configured to calculate one or more installment terms for an installment based on data included in the parsed installment request and the associated transaction record 212 identified by the querying module. The installment calculation module 214 may receive an installment request and a transaction record 212 as input, may calculate the installment terms based thereon, and may output the calculated installment terms. The installment terms may include, for example, a number of installments, installment amount, interest rate, annual percentage rate, installment period, total payment period, total payment amount, associated fees, etc. In some instances, the installment terms may be based on terms or criteria set forth by the issuer 106 or small business 104, such as may be stored in the account profile 208 associated with the transaction account or other data storage, such as in a memory 222 of the processing server 102, discussed in more detail below, which may be used by the installment calculation module 214 in the calculation of the installment terms. In some instances, the installment calculation module 214 may calculate installment terms corresponding to installment options parsed from the installment request, which may replace the installment options. For example, the small business 104 may specify a desired interest rate in the installment request, which may be replaced by the installment calculation module 214 based on preferences of the issuer 106 associated with the transaction account involved in the related payment transaction, wherein the preferences of the issuer 106 may be stored in a database of the processing server 102. The installment calculation module 214 may also be configured to receive such additional criteria, preferences, and data as input suitable for use in performing the calculations associated thereto.

The installment generation module 216 may be configured to generate transaction records for an installment transaction, which may be based on the transaction record 212 for the payment transaction being converted as well as the installment terms calculated by the installment calculation module 214 and installment options parsed from the installment request. The installment generation module 216 may receive the installment request, installment options, and transaction record 212 as input, may generate a plurality of installment transaction records based upon the received input, and may output the installment transaction records for use in updating the record database 210. Each of the plurality of installment transaction records generated by the installment generation module 216 may be associated with an installment transaction for payment of an installment amount by the small business 104, such that payment for each of the installment transactions comprising the plurality of installment transaction records may account for payment of the full transaction amount (e.g., and an additional amount, such as for interest and fees) for the payment transaction being converted. Each installment transaction record may include the transaction identifier of the payment transaction being converted (e.g., for reference to the payment transaction being paid), an installment amount, and a payment date.

The installment amount may be based on the transaction amount and one or more installment terms or options, such as the number of installments and interest rate. In some instances, the installment amount may be the same in each of the generated installment transaction records. In other instances, the installment amount may vary, such as based on installment terms or options. For example, the interest rate may be adjustable such that it increases or decreases over the total payment period of the installment, the interest may be applied to the outstanding balance of the total payment amount thus decreasing the installment amount over time, etc. The payment date may be based on the due date for the payment transaction being converted, and based on the one or more installment options or terms, such as the number of installments. In some instances, the payment date for each installment transaction record may be different, and may be separated by a predetermined period. For example, each payment date may be thirty days after a preceding payment date.

The updating module 218 may be configured to update the record database 210 to replace the transaction record 212 associated with the payment transaction being converted with the generated installment transaction records. In some instances, the transaction record 212 associated with the payment transaction may be retained, but may be indicated as having been converted to an installment such that the corresponding payment transaction need not be charged to the associated transaction account. In such instances, the transaction record 212 may be updated by the updating module to include a reference to the installment transaction records associated thereto.

In some embodiments, the processing server 102 may also include a transaction processing module. The transaction processing module may be configured to process payment transaction associated with transaction records 212 stored in the record database 210. In such embodiments, a payment request may be parsed from a data signal received by the receiving device 202, which may include a transaction identifier associated with an installment transaction record 212 stored in the record database 210. The installment transaction record may be identified via the execution of a query on the record database 210 by the querying module. The transaction processing module may be configured to initiate a payment transaction for payment of the installment amount included in the identified transaction record to the issuer 106 from the small business 104, using a transaction account associated with payment details parsed from the payment request. The payment transaction may be initiated via the transmission of payment details to an issuer 106 or acquirer 110 associated with the transaction account used to pay the installment amount, or the generation of a transaction message submitted to the payment network 112 for processing. For example, a transaction message may be generated that includes a data element configured to store the account identifier associated with the transaction account identified in payment details parsed from the payment request and a data element configured to store the installment amount, which may be submitted to the payment network 112 via the payment rails and processed accordingly. In embodiments where the issuer 106 to whom the installment payment is due may be the issuer of the transaction account identified for payment of the installment amount, the transaction processing module may, via the transmitting device 220 of the processing server 102 discussed below, electronically transmit a data signal to the issuer 106 via a suitable communication network superimposed with the payment request and installment transaction record 212 such that the issuer 106 may deduct the installment amount from the transaction account used for payment.

In some embodiments, the transaction processing module may also be configured to calculate reward points or other reward value for payment transactions processed and associated with transaction records 212 in the record database 210. In such embodiments, the processing server 102 may be a part of the payment network 112 or issuer 106 and used in the processing of payment transactions using traditional processes, such as described below with respect to the process 700 illustrated in FIG. 7. The transaction processing module, or another module as configured thereto, may identify a reward value based on the transaction amount for the transaction record 212 as well as the transaction date for the transaction providing payment as compared to the due date for the transaction record 212. For example, payment of a transaction record 212 may earn a higher reward value if made a predetermined time ahead of the due date.

The processing server 102 may further include a transmitting device 220. The transmitting device 220 may be configured to transmit data over one or more networks via one or more network protocols. In some embodiments, the transmitting device 220 may be configured to transmit data over the payment rails, such as using specially configured infrastructure associated with payment networks 112 for the transmission of transaction messages that include sensitive financial data and information, such as identified payment credentials. In some instances, the transmitting device 220 may be configured to transmit data to small businesses 104, issuers 106, acquirers 110, payment networks 112, and other entities via alternative networks, such as the Internet. In some embodiments, the transmitting device 220 may be comprised of multiple devices, such as different transmitting devices for transmitting data over different networks, such as a first transmitting device for transmitting data over the payment rails and a second transmitting device for transmitting data over the Internet. The transmitting device 220 may electronically transmit data signals that have data superimposed that may be parsed by a receiving computing device. In some instances, the transmitting device 220 may include one or more modules for superimposing, encoding, or otherwise formatting data into data signals suitable for transmission.

The transmitting device 220 may be configured to electronically transmit data signals to the issuer 106 superimposed with details suitable for the use in processing an installment payment, such as for the deduction of the installment amount from a transaction account associated with the small business 104 held by the issuer 106. The transmitting device 220 may also electronically transmit transaction messages generated for installment payment transactions to the payment network 112 and/or issuer 106 for processing using traditional methods. In some instances, the transmitting device 220 may be configured to electronically transmit data signals to the small business 104 via a suitable communication network that are superimposed with data associated with an installment request provided by the small business 104. The data may include, for example, a notification that the payment transaction was successfully converted into an installment, a notification of installment terms calculated by the installment calculation module 214, etc. The notification may be displayed, for instance, on the display of a mobile device of the small business 104 via an application running on the mobile device which is configured to communicate with the transmitting device 220 (e.g., the notification may be pushed to the mobile device, etc.). The transmitting device 220 may also be configured to electronically transmit data signals to computing devices associated with a small business 104 or other entity, which may be superimposed or otherwise encoded with installment notifications related to a payment transaction suitable for conversion into an installment. The notification may be displayed to the user of the computing device and used in the submission of an installment request to the processing server 102 (e.g., to be received by the receiving device 202).

The processing server 102 may also include a memory 222. The memory 222 may be configured to store data for use by the processing server 102 in performing the functions discussed herein. The memory 222 may be configured to store data using suitable data formatting methods and schema and may be any suitable type of memory, such as read-only memory, random access memory, etc. The memory 222 may include, for example, encryption keys and algorithms, communication protocols and standards, data formatting standards and protocols, program code for modules and application programs of the processing server 102, and other data that may be suitable for use by the processing server 102 in the performance of the functions disclosed herein as will be apparent to persons having skill in the relevant art.

Process for Payment of an Outstanding Transaction at an Issuer

Figure 3:
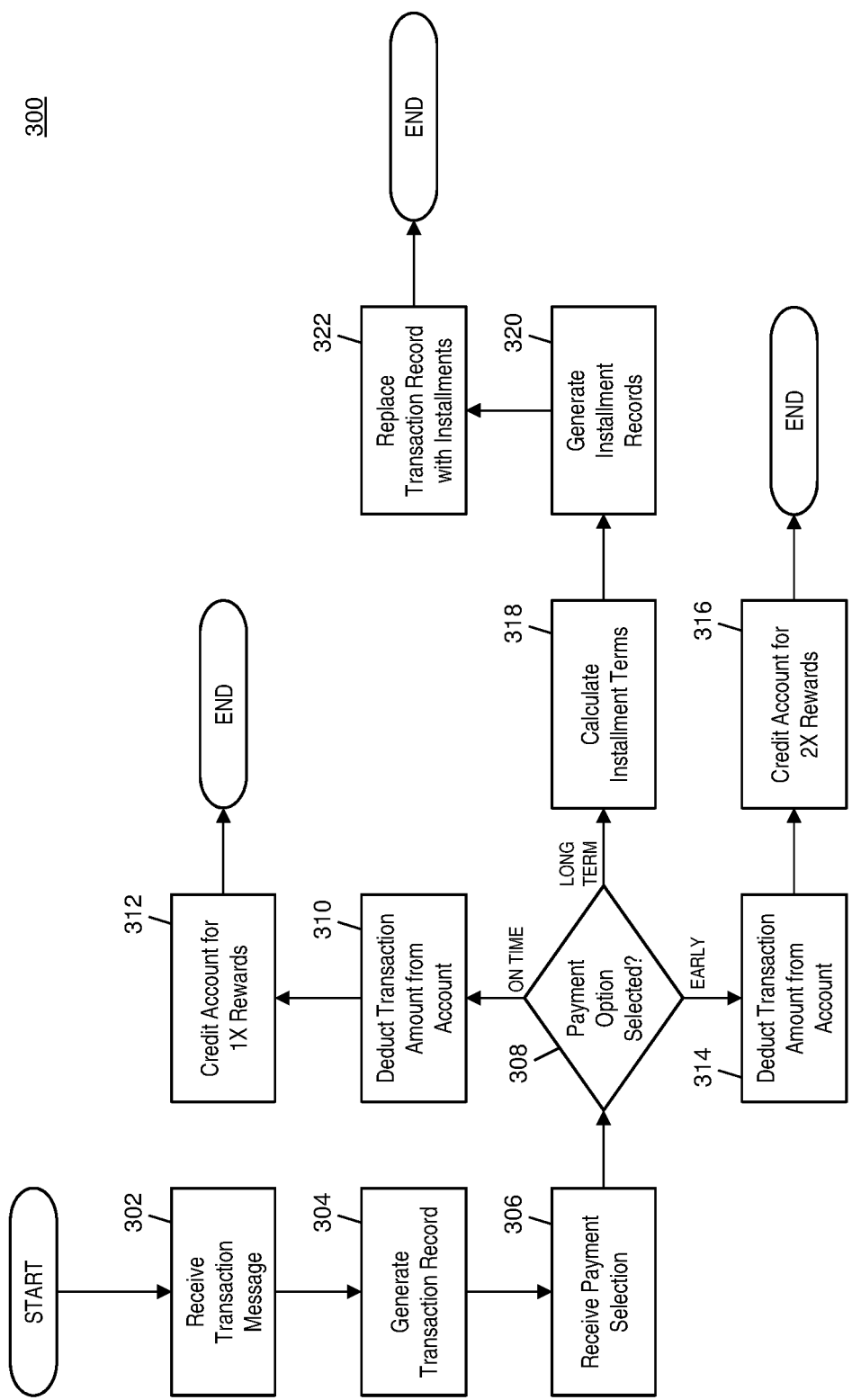
FIG. 3 is a flow diagram illustrating a process for facilitating installments for an electronic transaction using the processing server of FIG. 2 in accordance with exemplary embodiments.

FIG. 3 illustrates a process 300 for the payment of an outstanding payment transaction at an issuer 106, which may include facilitating of an installment transaction for the outstanding payment transaction at the issuer 106 for delayed payment of the outstanding payment transaction by a small business 104 as performed by the processing server 102. In some embodiments, the processing server 102 may perform the process 300 as part of the computing system of the issuer 106.

In step 302, the receiving device 202 of the processing server 102 may receive a transaction message for a payment transaction via the payment network 112. The transaction message may be formatted based on one or more standards, such as the ISO 8583 standard, and include a plurality of data elements including a first data element configured to store an account identifier associated with a transaction account involved in the payment transaction, a second data element configured to store transaction identifier associated with the payment transaction, a third data element configured to store a transaction date, and a fourth data element configured to store a transaction amount.

In step 304, a module of the processing device of the processing server 102 may generate a transaction record 212 corresponding to the payment transaction. The transaction record 212 may include a standardized set of data that is common to each of the transaction records 212 in the transaction database 210 corresponding to a payment transaction, which may include at least the transaction identifier, transaction amount, and transaction date. The transaction record may also include a due date, which may be calculated and/or identified by the module based on the transaction date and one or more criteria or preferences, such as preferences of the issuer 106 associated with the transaction account involved in the payment transaction or set by the small business 104 associated with the transaction account. In such instances, the preferences or criteria may be stored in an account profile 208 in the account database 206 related to the transaction account involved in the transaction, such as may be identified via execution of a query by the querying module using the account identifier stored in the first data element parsed from the received transaction message.

In step 306, the receiving device 202 of the processing server 102 may receive a data signal electronically transmitted via a suitable communication network (e.g., from the issuer 106 and/or small business 104) that is superimposed with a payment request. Once parsed by a parsing module of the processing server 102, the payment request may be deconstructed to obtain data included therein, which may include at least the transaction identifier stored in the second data element included in the received transaction message and an option selection. In some instances, the payment request may also include payment details associated with a transaction account used to pay the transaction amount for the original payment transaction.

In step 308, the transaction processing module of the processing server 102 may determine how to proceed in the process 300 based on the option selection parsed from the payment request. If the option select indicates that the small business 104 wishes to pay for the payment transaction on time (e.g., at or near the due date included in the transaction record 212), then, in step 310, the transaction processing module may initiate deduction of the transaction amount from the transaction account indicated in the payment request for payment (e.g., using the payment details). In instances where the processing server 102 may be external to the issuer 106, the initiation of the deduction may include electronically transmitting, by the transmitting device 220 of the processing server 102, a data signal to the issuer 106 superimposed with the payment request and/or data included therein, such as the payment details and transaction amount. In embodiments where the transaction account indicated in the payment details may have a separate issuer 106 from the transaction account involved in the original payment transaction, the initiation of the deduction may comprise the generation and submission of a transaction message to the payment network 112 for a payment transaction for payment from the indicated transaction account to the issuer 106. Such a transaction message may include data elements storing the payment details, transaction amount, and other suitable data such as a message type indicator indicating the transaction message to be an authorization request. In step 312, the transaction processing module may credit the account profile 208 for a reward value based on the transaction amount for the payment transaction due to the payment being provided on time.

If, in step 308, the transaction processing module determines that the option selection is for payment of the original payment transaction early (e.g., at a predetermined period of time ahead of the due date), then, in step 314, the transaction processing module of the processing server 102 may initiate deduction of the transaction amount from the transaction account indicated in the payment details, which may include processes discussed above with respect to step 310. In step 316, the transaction processing module may credit the account profile 208 for a reward value based on the transaction amount for the payment transaction that may be greater than the reward value provided if the transaction were paid for on time, such as by providing a reward value that is double the reward value credited in step 312. In such instances, the additional reward value may be provided as incentive to pay for payment transactions at the issuer 106 early.

If, in step 308, the option selection is for a long-term payment (e.g., the payment request is an installment request), then, in step 318, the installment calculation module 214 of the processing server 102 may calculate installment terms for the converted installment. The installment terms may be based on data included in the transaction record 212, data included in the installment request, and data stored in the corresponding account profile 208 and/or memory 222 that may be used in the calculation of installment terms, such as preferences of the small business 104 or issuer 106. The installment terms may include, for example, a number of installments, an installment amount, an interest rate, annual percentage rate, a total payment amount, an installment period, a total payment period, additional fees (e.g., initiation fee, creation fee, etc.) etc.

In step 320, the installment generation module 216 of the processing server 102 may generate installment records. Each installment record may be a transaction record 212 associated with an installment payment to be made that comprises the converted installment, and may include at least the installment amount, the transaction identifier, and a payment date. The payment data may be based on the transaction date and/or due date included in the original transaction record 212, as well as a number of installments, installment period, and/or total payment period as calculated in the installment terms for the installment or included in installment options in the installment request. In step 322, the updating module 218 may replace the original transaction record 212 in the record database 210 with the generated installment records. In some embodiments, the process 300 may also include the electronic transmitting of the installment records to the issuer 106 via the transmitting device 220 using a suitable communication device. The small business 104 may then pay for the converted payment transaction over time by paying the installment amount for each installment record at or by the respective payment date.

Figure 4:
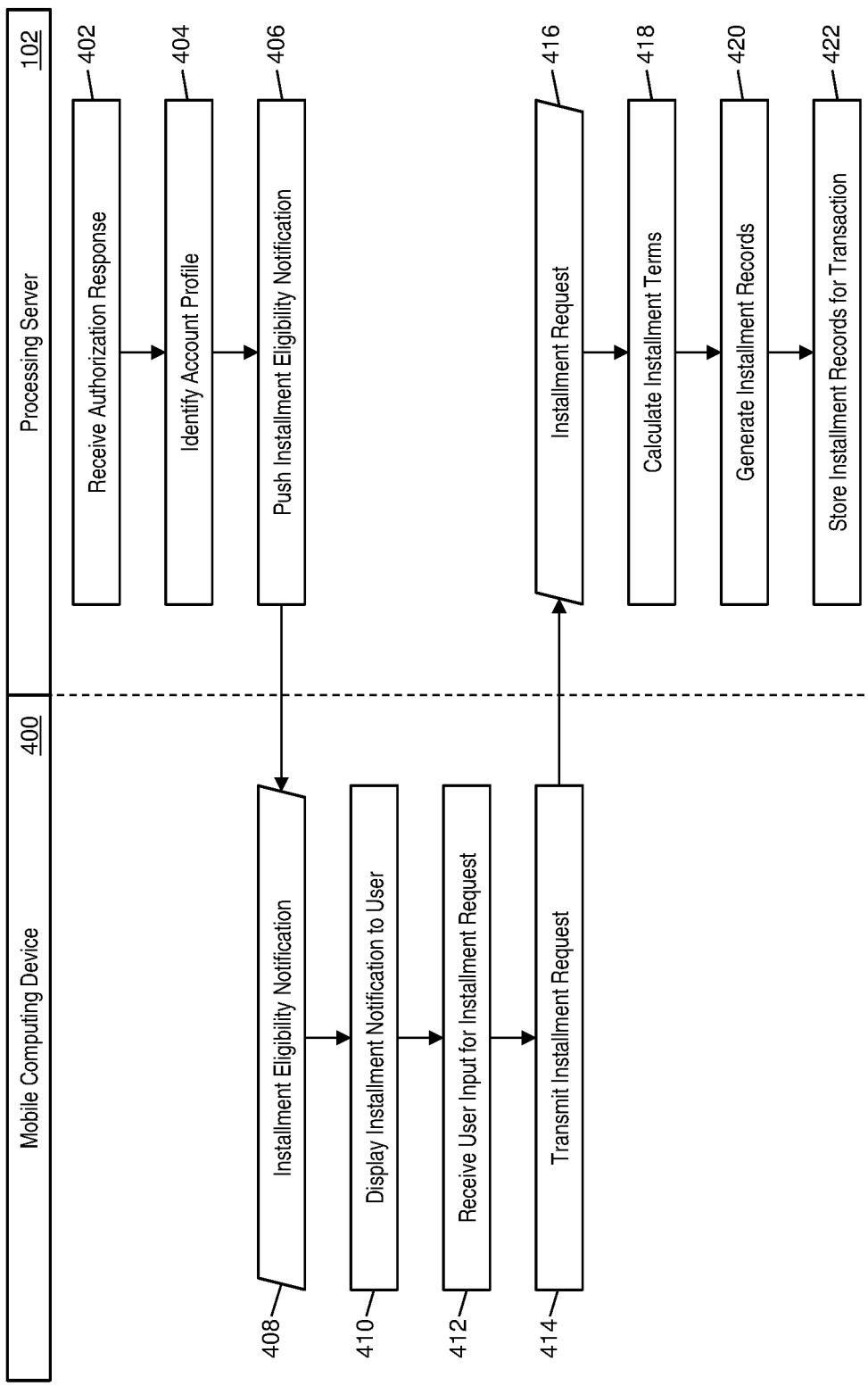
FIG. 4 is a flow diagram illustrating a process for the pushing of a notification to a mobile computing device for facilitation of an installment for multiple payment transactions in accordance with exemplary embodiments.

Process for Notification of a Payment Transaction Eligible for Installment Conversion FIG. 4 illustrates a process for the transmission of a notification to a mobile computing device 200 associated with a transaction account that indicates that a payment transaction funded via the transaction account is eligible for conversion to an installment transaction.

In step 402, the receiving device 202 of the processing server 102 may receive an authorization response for a payment transaction. The authorization response may be received from the issuer 106 (e.g., via the payment network 112) and may be a transaction message formatted pursuant to one or more standards that includes a message type indicator indicative of an authorization response and a plurality of data elements that includes data elements configured to store an account identifier, transaction identifier, a response code indicative of approval, and additional transaction data. In step 404, the processing server 102 may execute a query on the account database 206 to identify an account profile 208 related to the payment transaction that includes the account identifier included in the authorization response.

In step 406, the transmitting device 220 of the processing server 102 may electronically transmit a push notification to a mobile computing device 400 associated with the identified account profile 208. The mobile computing device 400 may be identified via a device identifier or other suitable communication details stored in the identified account profile 208. The push notification may include an installment notification, which may indicate to the user of the mobile computing device 400 (e.g., the small business 104 or other entity) that the payment transaction is eligible for conversion into an installment. The push notification may include the account identifier and/or transaction identifier, additional transaction data, and one or more installment terms or options. In step 408, the mobile computing device 400 may receive the notification.

In step 410, the mobile computing device 400 may display the notification and/or data included therein to the user via a suitable display device. The mobile computing device 400 may, for example, display the additional transaction data for use by the user in identifying the transaction to which the notification corresponds, such as a transaction time and/or date, merchant name, and transaction amount. The mobile computing device 400 may also display one or more installment options or terms, which may be used by the user in selecting one or more installment options or terms for use in the creation of the converted installment transaction. In step 412, the mobile computing device 400 may receive input from the user via one or more suitable input devices to comprise an installment request. For example, the user may select installment terms, which may include, for example, a number of installments, an installment amount, an interest rate, annual percentage rate, a total payment amount, an installment period, a total payment period, additional fees (e.g., initiation fee, creation fee, etc.).

In step 414, the mobile computing device 400 may electronically transmit a data signal back to the processing server 102 that is superimposed or otherwise encoded with an installment request. In step 416, the receiving device 202 of the processing server 102 may receive the installment request from the mobile computing device 400. In step 418, the installment calculation module 214 of the processing server 102 may calculate installment terms for the converted installment. The installment terms may be based on data included in the transaction record 212, data included in the installment request, and data stored in the corresponding account profile 208 and/or memory 222 that may be used in the calculation of installment terms, such as preferences of the small business 104 or issuer 106.

In step 420, the installment generation module 216 of the processing server 102 may generate installment records. Each installment record may be a transaction record 212 associated with an installment payment to be made that comprises the converted installment, and may include at least the installment amount, the transaction identifier, and a payment date. The payment data may be based on the transaction date and/or due date included in the authorization response, as well as a number of installments, installment period, and/or total payment period as calculated in the installment terms for the installment or included in installment options in the installment request. In step 422, the updating module 218 may store the generated transaction records in the record database 210. In instances where a transaction record may have been generated upon receipt of the authorization response, step 422 may include the deletion or replacement of the transaction record for the generated transaction records.

Graphical User Interfaces

Figure 5:
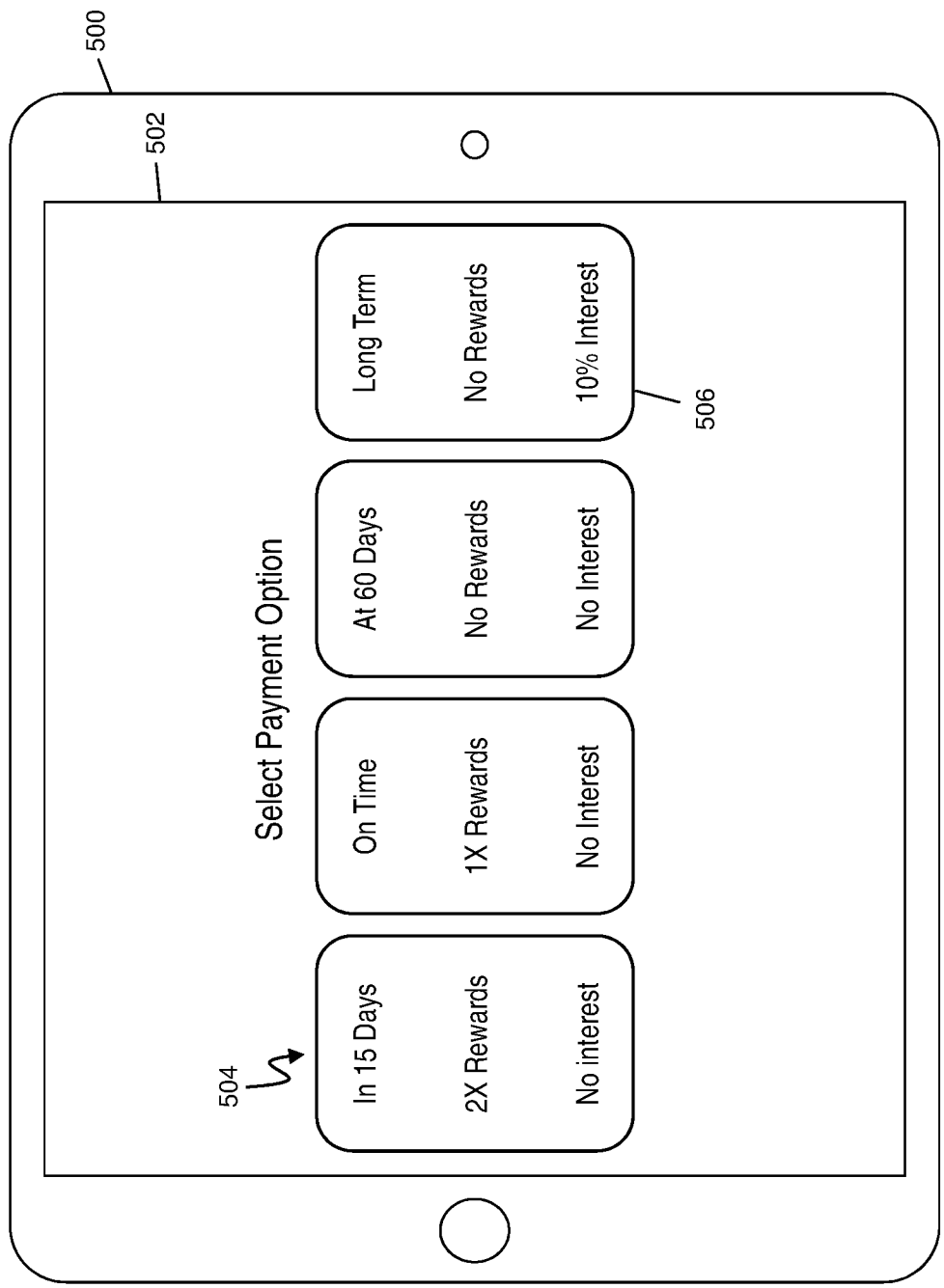
FIG. 5 is a diagram illustrating a graphical user interface for the selection of payment options including the conversion of a payment transaction to an installment transaction in accordance with exemplary embodiments.

FIGS. 5 and 6 illustrate exemplary graphical user interfaces of a computing device for use by the small business 104 in converting one or more payment transactions into an installment transaction. The graphical user interfaces described herein may be, for example, generated by an application installed on the computing device for use by the small business 104. It will be apparent to persons having skill in the relevant art that the interfaces illustrated in FIGS. 5 and 6 and discussed herein are provided as illustration only, and that additional and/or alternative interfaces may be used in conjunction with the methods and systems discussed herein.

As illustrated in FIG. 5, a computing device 500 may include a display device 402 configured to display a graphical user interface to a user (e.g., of the small business 104). The computing device 500 may be any type of computing device suitable for performing the functions disclosed herein, such as a desktop computer, laptop computer, notebook computer, tablet computer, cellular phone, smart phone, smart watch, smart television, wearable computing device, implantable computing device, etc. The display device 502 may be any suitable type of display device, such as a liquid crystal display, light-emitting diode display, cathode ray tube display, capacitive touch display, tactile feedback display, thin film transistor display, etc.

The display device 502 may display a plurality of payment options 504 to the user for payment of an outstanding payment transaction (e.g., corresponding to a transaction record 212 for which payment is due by the user to the issuer 106). Each of the payment options 504 may indicate a period of time for payment, a reward value if payment is made at the corresponding period of time, and an interest rate that may be applied to the transaction amount in the associated transaction record 212. As illustrated in FIG. 5, the payment options 504 may include a fifteen day payment, which may be an early payment for which additional rewards are provided, an on time payment (e.g., at thirty days) for which standard rewards are provided, a delayed payment at sixty days for which no rewards, but also no interest, are provided, and a long-term installment option 506. The installment option 506 may indicate that no rewards are available and that ten percent interest will be applied to the transaction via the delayed payment. When interacted with by the user of the computing device 500 via a suitable input device (e.g., the display device 502, a mouse, keyboard, click wheel, scroll wheel, camera, microphone, etc.), the installment option 506 may take the user to a second interface, which may be used to select installment options for the desired installment, such as illustrated in the interface of FIG. 6.

The interface of the display device 502 of the computing device 500 illustrated in FIG. 6 may include a list of transactions 602. The list of transactions 602 may include transaction details for payment transactions corresponding to transaction records 212 in the record database 210 associated with the user's transaction account (e.g., including the associated account identifier) that are awaiting payment by the user to the issuer 106 and for which an installment may be available. As illustrated in FIG. 6, the user may have four different transactions to select from for the creation of an installment. In the illustrated embodiment, the user may select multiple payment transactions for the creation of the installment.

The display device 502 may also display installment details 604. The installment details 604 may include one or more installment terms as calculated by the installment calculation module 214 of the processing server 102 that would be used in creation of the associated installment. The installment terms included in the installment details 604 may be based on the transaction details for the payment transactions selected from the list of transactions 602, as well as one or more transaction options 606 selected by the user. As illustrated in FIG. 6, the transaction options 606 may include a selection of the number of installments desired by the user. The installment details 604 may, as illustrated in FIG. 6, include the selected number of installments, as well as additional installment options, such as the monthly installment amount, an initiation fee, and the total payment amount for the selected installment. In some instances, installment details may also include additional fees that may be paid, which may be adjustable by the user depending on the selected installment options. For example, the initiation fee may be tied to the number of installments.

The interface may also include a create installment button 608. The create installment button 608 may, when interacted with by the user, initiate the creation of the installment. The initiation may comprise the electronic transmitting of a data signal to the processing server 102 from the computing device 500 via a suitable communication network, where the data signal is superimposed with an installment request. The installment request may include the transaction identifiers for the two payment transactions selected from the list of transactions 602 as well as installment options corresponding to the installment details 604.

Exemplary Method for Facilitation of Installments for an Electronic Transaction

Figure 7:
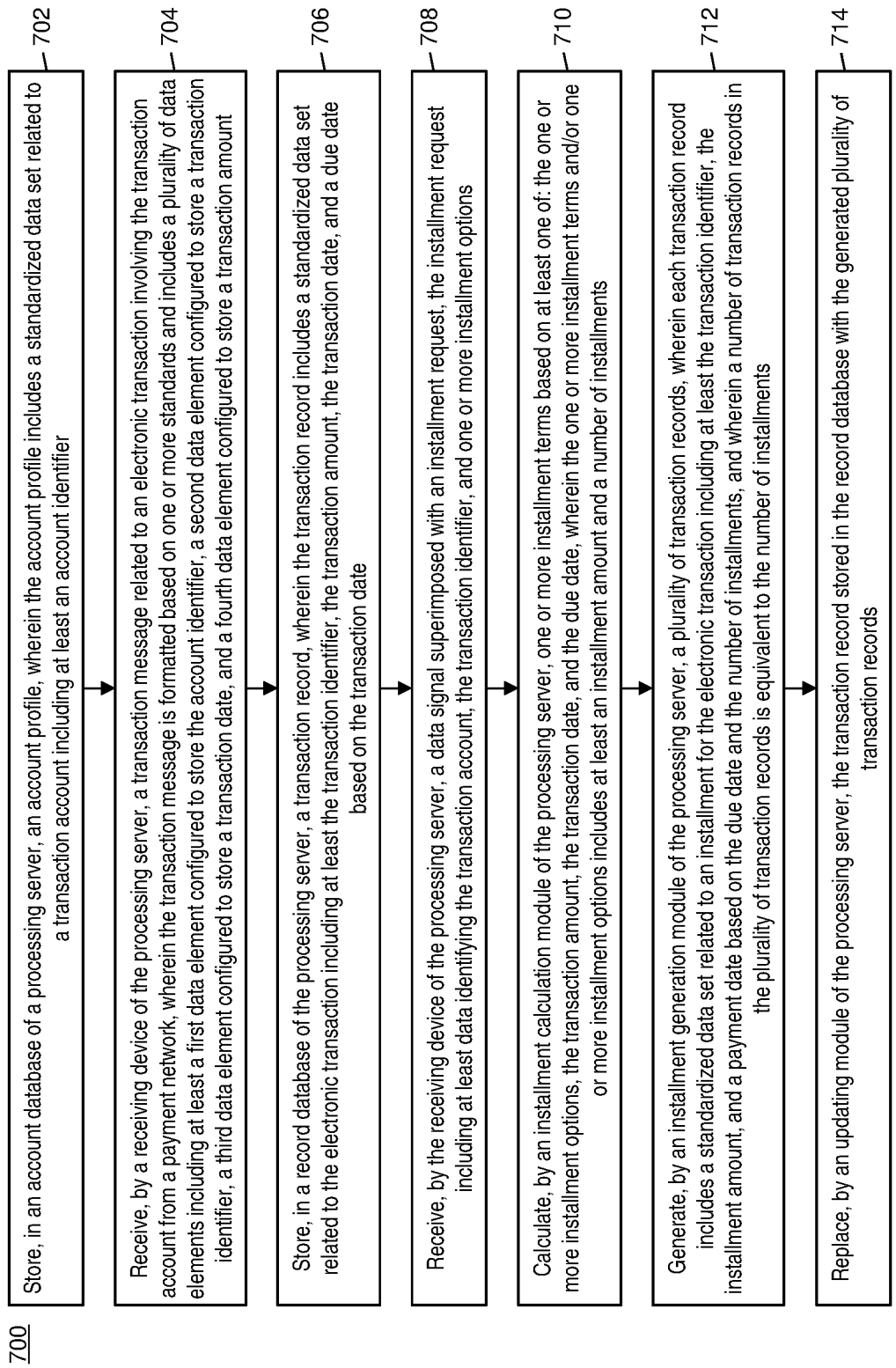
FIG. 7 is a flow chart illustrating an exemplary method for facilitation of installments for an electronic transaction in accordance with exemplary embodiments.

FIG. 7 illustrates a method 700 for the creation of installment records for an electronic transaction converted from a single payment transaction to a plurality of installment transactions at an issuer.

In step 702, an account profile (e.g., account profile 208) may be stored in an account database (e.g., the account database 206) of a processing server (e.g., the processing server 102), wherein the account profile includes a standardized data set related to a transaction account including at least an account identifier. In step 704, a transaction message related to an electronic transaction involving the transaction account may be received by a receiving device (e.g., the receiving device 202) of the processing server from a payment network (e.g., the payment network 112), wherein the transaction message is formatted based on one or more standards and includes a plurality of data elements including at least a first data element configured to store the account identifier, a second data element configured to store a transaction identifier, a third data element configured to store a transaction date, and a fourth data element configured to store a transaction amount.

In step 706, a transaction record (e.g., transaction record 212) may be stored in a record database (e.g., the record database 210) of the processing server, wherein the transaction record includes a standardized data set related to the electronic transaction including at least the transaction identifier, the transaction amount, the transaction date, and a due date based on the transaction date. In step 708, a data signal superimposed with an installment request may be received by the receiving device of the processing server, the installment request including at least data identifying the transaction account, the transaction identifier, and one or more installment options.

In step 710, an installment calculation module (e.g., the installment calculation module 214) of the processing server may calculate one or more installment terms based on at least one of: the one or more installment options, the transaction amount, the transaction date, and the due date, wherein the one or more installment terms and/or one or more installment options includes at least an installment amount and a number of installments. In step 712, a plurality of transaction records may be generated by an installment generation module (e.g., the installment generation module 216) of the processing server, wherein each transaction record includes a standardized data set related to an installment for the electronic transaction including at least the transaction identifier, the installment amount, and a payment date based on the due date and the number of installments, and wherein a number of transaction records in the plurality of transaction records is equivalent to the number of installments. In step 714, the transaction record stored in the record database may be replaced, by an updating module (e.g., the updating module 218) of the processing server, with the generated plurality of transaction records.

In one embodiment, the method 700 may further include electronically transmitting, by a transmitting device (e.g., the transmitting device 220) of the processing server, a data signal superimposed with a confirmation in response to the received data signal superimposed with the installment request, wherein the confirmation includes at least the calculated one or more installment terms. In some embodiments, the data signal superimposed with the installment request may be electronically transmitted by a management server (e.g., the processing server 102) associated with a payment network. In one embodiment, the payment date included in each of the plurality of transaction records may be a different date.

In some embodiments, the account profile may further include an account balance, and the processing server may include an account management module configured to deduct, for each of the plurality of transaction records, the installment amount from the account balance at the respective payment date. In one embodiment, the installment amount may be based on at least the transaction amount and the number of installments. In a further embodiment, a total of a product of the installment amount and the number of installments may be greater than the transaction amount.

In some embodiments, the method 700 may also include receiving, by the receiving device of the processing server, a second transaction message related to a second electronic transaction involving the transaction account from the payment network, wherein the second transaction message is formatted based on the one or more standards and includes a plurality of data elements including at least a first data element configured to store the account identifier, a second data element configured to store a second transaction identifier, a third data element configured to store a second transaction date, and a fourth data element configured to store a second transaction amount, wherein the installment request further includes the second transaction identifier. In a further embodiment, the installment amount may be based on at least a total of the transaction amount and the second transaction amount and the number of installments. In another further embodiment, the method 700 may even further include storing, in the record database of the processing server, a second transaction record, wherein the transaction record includes a standardized data set related to the second electronic transaction including at least the second transaction identifier, the second transaction amount, the second transaction date, and a second due date based on the second transaction date, wherein the replacing step further includes replacing the second transaction record.

In one embodiment, the method 700 may further include electronically transmitting, by the transmitting device of the processing server, a data signal superimposed with an installment notification to a mobile computing device associated with a specific device identifier, wherein the installment notification includes at least data identifying the transaction account, the transaction identifier, and at least one of the one or more installment options, wherein the data signal superimposed with the installment notification is electronically transmitted to the mobile computing device prior to receiving the data signal superimposed with the installment request, the data signal superimposed with the installment request is received from the mobile computing device associated with the specific device identifier, and the account profile further includes the specific device identifier. In some embodiments, the account profile may further include a linked account identifier associated with an alternative transaction account, and each of the plurality of transaction records may further include the linked account identifier. In a further embodiment, the related transaction account may be a debit account, and the alternative transaction account may be a credit account.

Payment Transaction Processing System and Process

Figure 8:
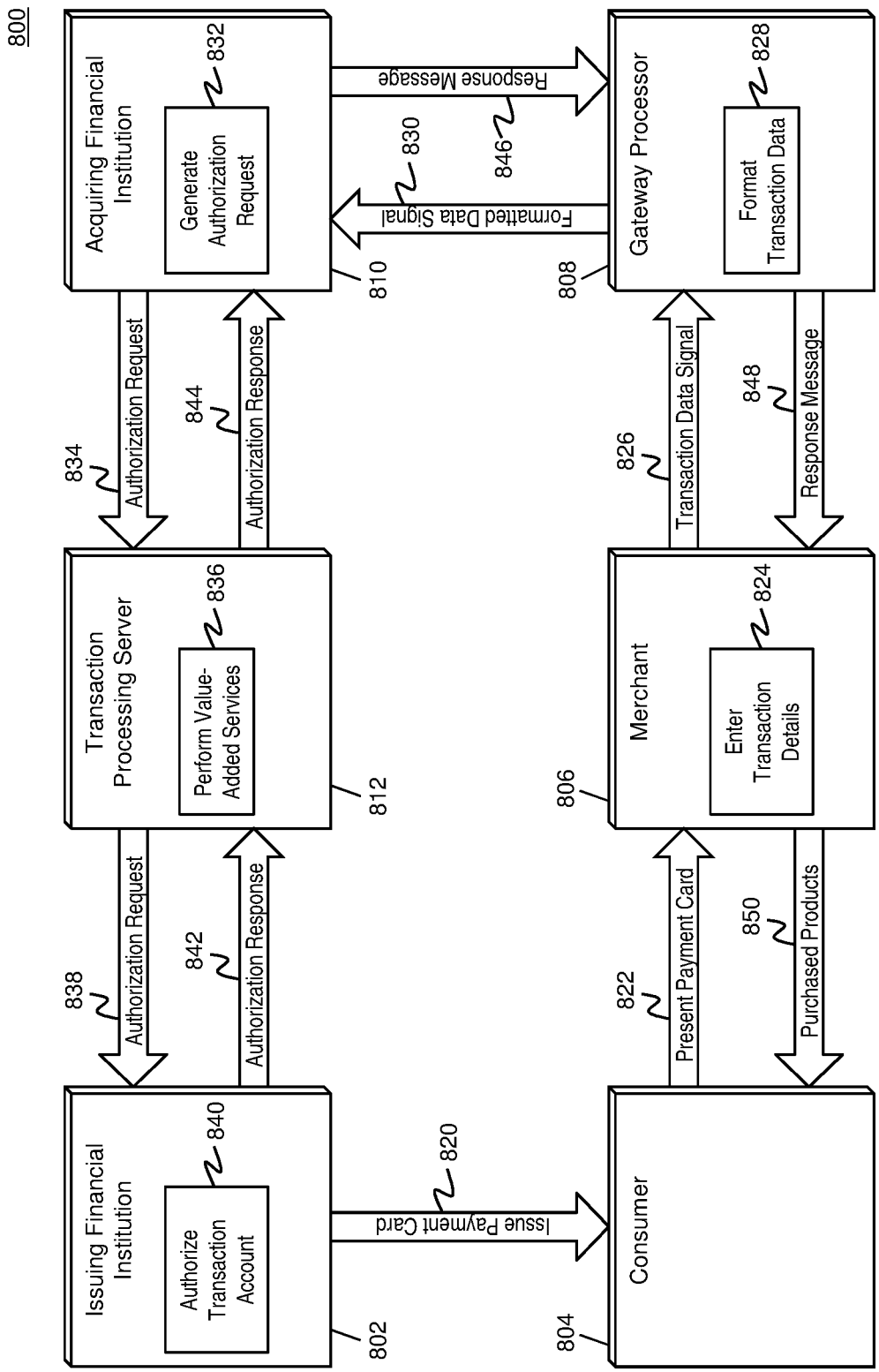
FIG. 8 is a flow diagram illustrating the processing of a payment transaction in accordance with exemplary embodiments.

FIG. 8 illustrates a transaction processing system and a process 800 for the processing of payment transactions in the system. The process 800 and steps included therein may be performed by one or more components of the system 100 discussed above, such as the small business 104, issuers 106, merchants 108, acquirers 110, processing server 102, and payment network 112. The processing of payment transactions using the system and process 800 illustrated in FIG. 8 and discussed below may utilize the payment rails, which may be comprised of the computing devices and infrastructure utilized to perform the steps of the process 800 as specially configured and programmed by the entities discussed below, including the transaction processing server 812, which may be associated with one or more payment networks configured to processing payment transactions. It will be apparent to persons having skill in the relevant art that the process 800 may be incorporated into the processes illustrated in FIGS. 3, 4 and 7, discussed above, with respect to the step or steps involved in the processing of a payment transaction. In addition, the entities discussed herein for performing the process 800 may include one or more computing devices or systems configured to perform the functions discussed below. For instance, the merchant 804 may be comprised of one or more point of sale devices, a local communication network, a computing server, and other devices configured to perform the functions discussed below.

In step 820, an issuing financial institution 802 may issue a payment card or other suitable payment instrument to a consumer 804. The issuing financial institution may be a financial institution, such as a bank, or other suitable type of entity that administers and manages payment accounts and/or payment instruments for use with payment accounts that can be used to fund payment transactions. The consumer 804 may have a transaction account with the issuing financial institution 802 for which the issued payment card is associated, such that, when used in a payment transaction, the payment transaction is funded by the associated transaction account. In some embodiments, the payment card may be issued to the consumer 804 physically. In other embodiments, the payment card may be a virtual payment card or otherwise provisioned to the consumer 804 in an electronic format.

In step 822, the consumer 804 may present the issued payment card to a merchant 806 for use in funding a payment transaction. The merchant 806 may be a business, another consumer, or any entity that may engage in a payment transaction with the consumer 804. The payment card may be presented by the consumer 804 via providing the physical card to the merchant 806, electronically transmitting (e.g., via near field communication, wireless transmission, or other suitable electronic transmission type and protocol) payment details for the payment card, or initiating transmission of payment details to the merchant 806 via a third party. The merchant 806 may receive the payment details (e.g., via the electronic transmission, via reading them from a physical payment card, etc.), which may include at least a transaction account number associated with the payment card and/or associated transaction account. In some instances, the payment details may include one or more application cryptograms, which may be used in the processing of the payment transaction.

In step 824, the merchant 806 may enter transaction details into a point of sale computing system. The transaction details may include the payment details provided by the consumer 804 associated with the payment card and additional details associated with the transaction, such as a transaction amount, time and/or date, product data, offer data, loyalty data, reward data, merchant data, consumer data, point of sale data, etc. Transaction details may be entered into the point of sale system of the merchant 806 via one or more input devices, such as an optical bar code scanner configured to scan product bar codes, a keyboard configured to receive product codes input by a user, etc. The merchant point of sale system may be a specifically configured computing device and/or special purpose computing device intended for the purpose of processing electronic financial transactions and communicating with a payment network (e.g., via the payment rails). The merchant point of sale system may be an electronic device upon which a point of sale system application is run, wherein the application causes the electronic device to receive and communicated electronic financial transaction information to a payment network. In some embodiments, the merchant 806 may be an online retailer in an e-commerce transaction. In such embodiments, the transaction details may be entered in a shopping cart or other repository for storing transaction data in an electronic transaction as will be apparent to persons having skill in the relevant art.

In step 826, the merchant 806 may electronically transmit a data signal superimposed with transaction data to a gateway processor 808. The gateway processor 808 may be an entity configured to receive transaction details from a merchant 806 for formatting and transmission to an acquiring financial institution 810. In some instances, a gateway processor 808 may be associated with a plurality of merchants 806 and a plurality of acquiring financial institutions 810. In such instances, the gateway processor 808 may receive transaction details for a plurality of different transactions involving various merchants, which may be forwarded on to appropriate acquiring financial institutions 810. By having relationships with multiple acquiring financial institutions 810 and having the requisite infrastructure to communicate with financial institutions using the payment rails, such as using application programming interfaces associated with the gateway processor 508 or financial institutions used for the submission, receipt, and retrieval of data, a gateway processor 808 may act as an intermediary for a merchant 806 to be able to conduct payment transactions via a single communication channel and format with the gateway processor 808, without having to maintain relationships with multiple acquiring financial institutions 810 and payment processors and the hardware associated thereto. Acquiring financial institutions 810 may be financial institutions, such as banks, or other entities that administers and manages payment accounts and/or payment instruments for use with payment accounts. In some instances, acquiring financial institutions 810 may manage transaction accounts for merchants 806. In some cases, a single financial institution may operate as both an issuing financial institution 802 and an acquiring financial institution 810.

The data signal transmitted from the merchant 806 to the gateway processor 808 may be superimposed with the transaction details for the payment transaction, which may be formatted based on one or more standards. In some embodiments, the standards may be set forth by the gateway processor 808, which may use a unique, proprietary format for the transmission of transaction data to/from the gateway processor 808. In other embodiments, a public standard may be used, such as the International Organization for Standardization's ISO 8883 standard. The standard may indicate the types of data that may be included, the formatting of the data, how the data is to be stored and transmitted, and other criteria for the transmission of the transaction data to the gateway processor 808.

In step 828, the gateway processor 808 may parse the transaction data signal to obtain the transaction data superimposed thereon and may format the transaction data as necessary. The formatting of the transaction data may be performed by the gateway processor 808 based on the proprietary standards of the gateway processor 808 or an acquiring financial institution 810 associated with the payment transaction. The proprietary standards may specify the type of data included in the transaction data and the format for storage and transmission of the data. The acquiring financial institution 810 may be identified by the gateway processor 808 using the transaction data, such as by parsing the transaction data (e.g., deconstructing into data elements) to obtain an account identifier included therein associated with the acquiring financial institution 810. In some instances, the gateway processor 808 may then format the transaction data based on the identified acquiring financial institution 810, such as to comply with standards of formatting specified by the acquiring financial institution 810. In some embodiments, the identified acquiring financial institution 810 may be associated with the merchant 806 involved in the payment transaction, and, in some cases, may manage a transaction account associated with the merchant 806.

In step 830, the gateway processor 808 may electronically transmit a data signal superimposed with the formatted transaction data to the identified acquiring financial institution 810. The acquiring financial institution 810 may receive the data signal and parse the signal to obtain the formatted transaction data superimposed thereon. In step 832, the acquiring financial institution may generate an authorization request for the payment transaction based on the formatted transaction data. The authorization request may be a specially formatted transaction message that is formatted pursuant to one or more standards, such as the ISO 8883 standard and standards set forth by a payment processor used to process the payment transaction, such as a payment network. The authorization request may be a transaction message that includes a message type indicator indicative of an authorization request, which may indicate that the merchant 806 involved in the payment transaction is requesting payment or a promise of payment from the issuing financial institution 802 for the transaction. The authorization request may include a plurality of data elements, each data element being configured to store data as set forth in the associated standards, such as for storing an account number, application cryptogram, transaction amount, issuing financial institution 802 information, etc.

In step 834, the acquiring financial institution 810 may electronically transmit the authorization request to a transaction processing server 812 for processing. The transaction processing server 812 may be comprised of one or more computing devices as part of a payment network configured to process payment transactions. In some embodiments, the authorization request may be transmitted by a transaction processor at the acquiring financial institution 810 or other entity associated with the acquiring financial institution. The transaction processor may be one or more computing devices that include a plurality of communication channels for communication with the transaction processing server 812 for the transmission of transaction messages and other data to and from the transaction processing server 812. In some embodiments, the payment network associated with the transaction processing server 812 may own or operate each transaction processor such that the payment network may maintain control over the communication of transaction messages to and from the transaction processing server 812 for network and informational security.

In step 836, the transaction processing server 812 may perform value-added services for the payment transaction. Value-added services may be services specified by the issuing financial institution 802 that may provide additional value to the issuing financial institution 802 or the consumer 804 in the processing of payment transactions. Value-added services may include, for example, fraud scoring, transaction or account controls, account number mapping, offer redemption, loyalty processing, etc. For instance, when the transaction processing server 812 receives the transaction, a fraud score for the transaction may be calculated based on the data included therein and one or more fraud scoring algorithms and/or engines. In some instances, the transaction processing server 812 may first identify the issuing financial institution 802 associated with the transaction, and then identify any services indicated by the issuing financial institution 802 to be performed. The issuing financial institution 802 may be identified, for example, by data included in a specific data element included in the authorization request, such as an issuer identification number. In another example, the issuing financial institution 802 may be identified by the primary account number stored in the authorization request, such as by using a portion of the primary account number (e.g., a bank identification number) for identification.

In step 838, the transaction processing server 812 may electronically transmit the authorization request to the issuing financial institution 802. In some instances, the authorization request may be modified, or additional data included in or transmitted accompanying the authorization request as a result of the performance of value-added services by the transaction processing server 812. In some embodiments, the authorization request may be transmitted to a transaction processor (e.g., owned or operated by the transaction processing server 812) situated at the issuing financial institution 802 or an entity associated thereof, which may forward the authorization request to the issuing financial institution 802.

In step 840, the issuing financial institution 802 may authorize the transaction account for payment of the payment transaction. The authorization may be based on an available credit amount for the transaction account and the transaction amount for the payment transaction, fraud scores provided by the transaction processing server 812, and other considerations that will be apparent to persons having skill in the relevant art. The issuing financial institution 802 may modify the authorization request to include a response code indicating approval (e.g., or denial if the transaction is to be denied) of the payment transaction. The issuing financial institution 802 may also modify a message type indicator for the transaction message to indicate that the transaction message is changed to be an authorization response. In step 842, the issuing financial institution 840 may transmit (e.g., via a transaction processor) the authorization response to the transaction processing server 812.

In step 844, the transaction processing server 812 may forward the authorization response to the acquiring financial institution 810 (e.g., via a transaction processor). In step 846, the acquiring financial institution may generate a response message indicating approval or denial of the payment transaction as indicated in the response code of the authorization response, and may transmit the response message to the gateway processor 808 using the standards and protocols set forth by the gateway processor 808. In step 848, the gateway processor 808 may forward the response message to the merchant 806 using the appropriate standards and protocols. In step 880, the merchant 806 may then provide the products purchased by the consumer 804 as part of the payment transaction to the consumer 804.

In some embodiments, once the process 800 has completed, payment from the issuing financial institution 802 to the acquiring financial institution 810 may be performed. In some instances, the payment may be made immediately or within one business day. In other instances, the payment may be made after a period of time, and in response to the submission of a clearing request from the acquiring financial institution 810 to the issuing financial institution 802 via the transaction processing server 802. In such instances, clearing requests for multiple payment transactions may be aggregated into a single clearing request, which may be used by the transaction processing server 812 to identify overall payments to be made by whom and to whom for settlement of payment transactions.

In some instances, the system may also be configured to perform the processing of payment transactions in instances where communication paths may be unavailable. For example, if the issuing financial institution is unavailable to perform authorization of the transaction account (e.g., in step 840), the transaction processing server 812 may be configured to perform authorization of transactions on behalf of the issuing financial institution. Such actions may be referred to as "stand-in processing," where the transaction processing server "stands in" as the issuing financial institution 802. In such instances, the transaction processing server 812 may utilize rules set forth by the issuing financial institution 802 to determine approval or denial of the payment transaction, and may modify the transaction message accordingly prior to forwarding to the acquiring financial institution 810 in step 844. The transaction processing server 812 may retain data associated with transactions for which the transaction processing server 812 stands in, and may transmit the retained data to the issuing financial institution 802 once communication is reestablished. The issuing financial institution 802 may then process transaction accounts accordingly to accommodate for the time of lost communication.

In another example, if the transaction processing server 812 is unavailable for submission of the authorization request by the acquiring financial institution 810, then the transaction processor at the acquiring financial institution 810 may be configured to perform the processing of the transaction processing server 812 and the issuing financial institution 802. The transaction processor may include rules and data suitable for use in making a determination of approval or denial of the payment transaction based on the data included therein. For instance, the issuing financial institution 802 and/or transaction processing server 812 may set limits on transaction type, transaction amount, etc. that may be stored in the transaction processor and used to determine approval or denial of a payment transaction based thereon. In such instances, the acquiring financial institution 810 may receive an authorization response for the payment transaction even if the transaction processing server 812 is unavailable, ensuring that transactions are processed and no downtime is experienced even in instances where communication is unavailable. In such cases, the transaction processor may store transaction details for the payment transactions, which may be transmitted to the transaction processing server 812 (e.g., and from there to the associated issuing financial institutions 802) once communication is reestablished.

In some embodiments, transaction processors may be configured to include a plurality of different communication channels, which may utilize multiple communication cards and/or devices, to communicate with the transaction processing server 812 for the sending and receiving of transaction messages. For example, a transaction processor may be comprised of multiple computing devices, each having multiple communication ports that are connected to the transaction processing server 812. In such embodiments, the transaction processor may cycle through the communication channels when transmitting transaction messages to the transaction processing server 812, to alleviate network congestion and ensure faster, smoother communications. Furthermore, in instances where a communication channel may be interrupted or otherwise unavailable, alternative communication channels may thereby be available, to further increase the uptime of the network.

In some embodiments, transaction processors may be configured to communicate directly with other transaction processors. For example, a transaction processor at an acquiring financial institution 810 may identify that an authorization request involves an issuing financial institution 802 (e.g., via the bank identification number included in the transaction message) for which no value-added services are required. The transaction processor at the acquiring financial institution 810 may then transmit the authorization request directly to the transaction processor at the issuing financial institution 802 (e.g., without the authorization request passing through the transaction processing server 812), where the issuing financial institution 802 may process the transaction accordingly.

The methods discussed above for the processing of payment transactions that utilize multiple methods of communication using multiple communication channels, and includes fail safes to provide for the processing of payment transactions at multiple points in the process and at multiple locations in the system, as well as redundancies to ensure that communications arrive at their destination successfully even in instances of interruptions, may provide for a robust system that ensures that payment transactions are always processed successfully with minimal error and interruption. This advanced network and its infrastructure and topology may be commonly referred to as "payment rails," where transaction data may be submitted to the payment rails from merchants at millions of different points of sale, to be routed through the infrastructure to the appropriate transaction processing servers 812 for processing. The payment rails may be such that a general purpose computing device may be unable to properly format or submit communications to the rails, without specialized programming and/or configuration. Through the specialized purposing of a computing device, the computing device may be configured to submit transaction data to the appropriate entity (e.g., a gateway processor 808, acquiring financial institution 810, etc.) for processing using this advanced network, and to quickly and efficiently receive a response regarding the ability for a consumer 804 to fund the payment transaction.

Computer System Architecture

Figure 9:
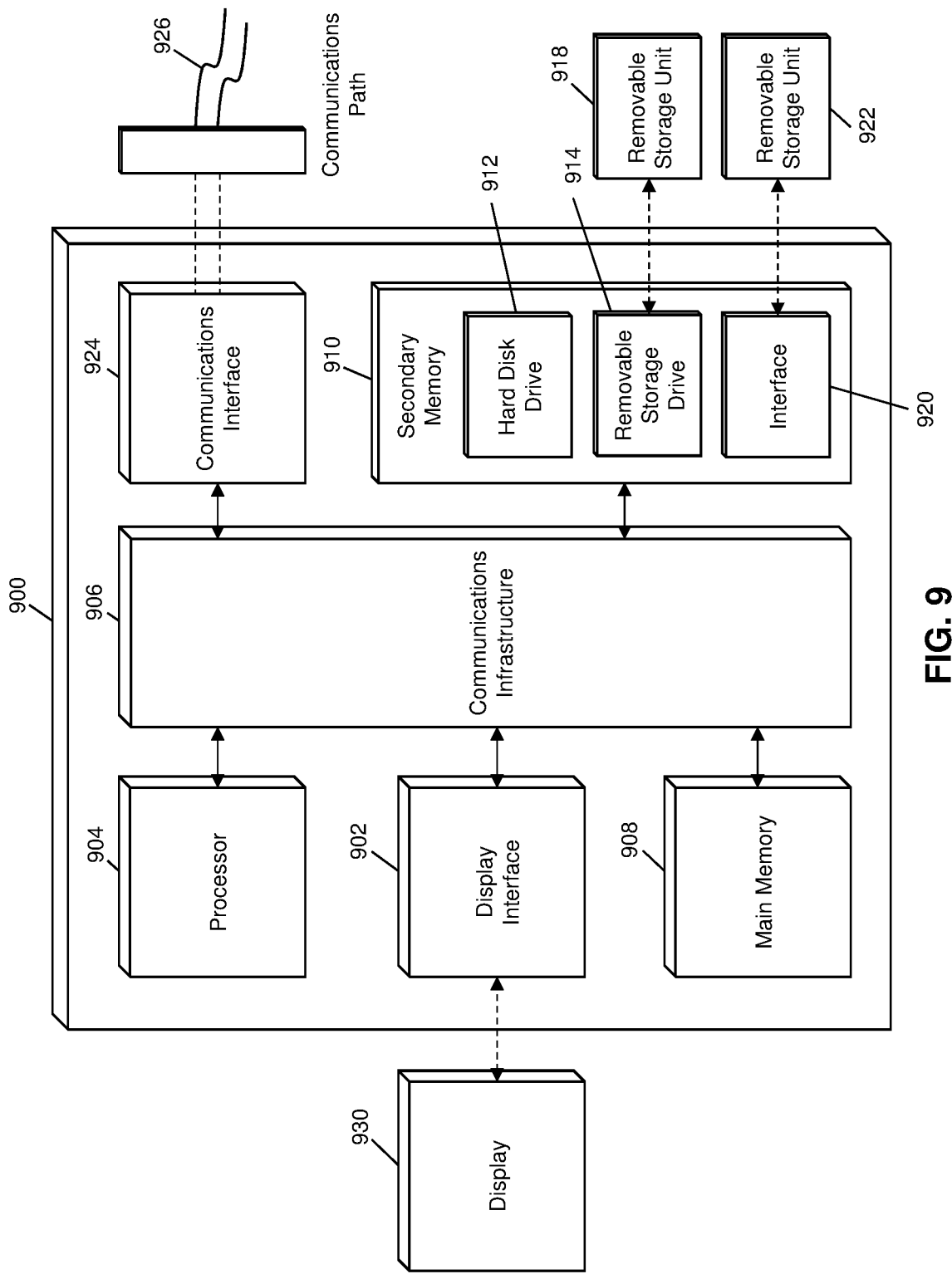
FIG. 9 is a block diagram illustrating a computer system architecture in accordance with exemplary embodiments.

FIG. 9 illustrates a computer system 900 in which embodiments of the present disclosure, or portions thereof, may be implemented as computer-readable code. For example, the processing server 102 of FIG. 1 may be implemented in the computer system 900 using hardware, software, firmware, non-transitory computer readable media having instructions stored thereon, or a combination thereof and may be implemented in one or more computer systems or other processing systems. Hardware, software, or any combination thereof may embody modules and components used to implement, for example, the methods of FIGS. 3, 4, 7, and 8. If programmable logic is used, such logic may execute on a commercially available processing platform or a special purpose device. A person having ordinary skill in the art may appreciate that embodiments of the disclosed subject matter can be practiced with various computer system configurations, including multi-core multiprocessor systems, minicomputers, mainframe computers, computers linked or clustered with distributed functions, as well as pervasive or miniature computers that may be embedded into virtually any device. For instance, at least one processor device and a memory may be used to implement the above described embodiments.

A processor unit or device as discussed herein may be a single processor, a plurality of processors, or combinations thereof. Processor devices may have one or more processor "cores." The terms "computer program medium," "non-transitory computer readable medium," and "computer usable medium" as discussed herein are used to generally refer to tangible media such as a removable storage unit 918, a removable storage unit 922, and a hard disk installed in hard disk drive 912.

Various embodiments of the present disclosure are described in terms of this example computer system 900. After reading this description, it will become apparent to a person skilled in the relevant art how to implement the present disclosure using other computer systems and/or computer architectures. Although operations may be described as a sequential process, some of the operations may in fact be performed in parallel, concurrently, and/or in a distributed environment, and with program code stored locally or remotely for access by single or multi-processor machines. In addition, in some embodiments the order of operations may be rearranged without departing from the spirit of the disclosed subject matter.

Processor device 904 may be a special purpose or a general purpose processor device. The processor device 904 may be connected to a communications infrastructure 906, such as a bus, message queue, network, multi-core message-passing scheme, etc. The network may be any network suitable for performing the functions as disclosed herein and may include a local area network (LAN), a wide area network (WAN), a wireless network (e.g., WiFi), a mobile communication network, a satellite network, the Internet, fiber optic, coaxial cable, infrared, radio frequency (RF), or any combination thereof. Other suitable network types and configurations will be apparent to persons having skill in the relevant art. The computer system 900 may also include a main memory 908 (e.g., random access memory, read-only memory, etc.), and may also include a secondary memory 910. The secondary memory 910 may include the hard disk drive 912 and a removable storage drive 914, such as a floppy disk drive, a magnetic tape drive, an optical disk drive, a flash memory, etc.

The removable storage drive 914 may read from and/or write to the removable storage unit 918 in a well-known manner. The removable storage unit 918 may include a removable storage media that may be read by and written to by the removable storage drive 914. For example, if the removable storage drive 914 is a floppy disk drive or universal serial bus port, the removable storage unit 918 may be a floppy disk or portable flash drive, respectively. In one embodiment, the removable storage unit 918 may be non-transitory computer readable recording media.

In some embodiments, the secondary memory 910 may include alternative means for allowing computer programs or other instructions to be loaded into the computer system 900, for example, the removable storage unit 922 and an interface 920. Examples of such means may include a program cartridge and cartridge interface (e.g., as found in video game systems), a removable memory chip (e.g., EEPROM, PROM, etc.) and associated socket, and other removable storage units 922 and interfaces 920 as will be apparent to persons having skill in the relevant art.

Data stored in the computer system 900 (e.g., in the main memory 908 and/or the secondary memory 910) may be stored on any type of suitable computer readable media, such as optical storage (e.g., a compact disc, digital versatile disc, Blu-ray disc, etc.) or magnetic tape storage (e.g., a hard disk drive). The data may be configured in any type of suitable database configuration, such as a relational database, a structured query language (SQL) database, a distributed database, an object database, etc. Suitable configurations and storage types will be apparent to persons having skill in the relevant art.

The computer system 900 may also include a communications interface 924. The communications interface 924 may be configured to allow software and data to be transferred between the computer system 900 and external devices. Exemplary communications interfaces 924 may include a modem, a network interface (e.g., an Ethernet card), a communications port, a PCMCIA slot and card, etc. Software and data transferred via the communications interface 924 may be in the form of signals, which may be electronic, electromagnetic, optical, or other signals as will be apparent to persons having skill in the relevant art. The signals may travel via a communications path 926, which may be configured to carry the signals and may be implemented using wire, cable, fiber optics, a phone line, a cellular phone link, a radio frequency link, etc.

The computer system 900 may further include a display interface 902. The display interface 902 may be configured to allow data to be transferred between the computer system 900 and external display 930. Exemplary display interfaces 902 may include high-definition multimedia interface (HDMI), digital visual interface (DVI), video graphics array (VGA), etc. The display 930 may be any suitable type of display for displaying data transmitted via the display interface 902 of the computer system 900, including a cathode ray tube (CRT) display, liquid crystal display (LCD), light-emitting diode (LED) display, capacitive touch display, thin-film transistor (TFT) display, etc.

Computer program medium and computer usable medium may refer to memories, such as the main memory 908 and secondary memory 910, which may be memory semiconductors (e.g., DRAMs, etc.). These computer program products may be means for providing software to the computer system 900. Computer programs (e.g., computer control logic) may be stored in the main memory 908 and/or the secondary memory 910. Computer programs may also be received via the communications interface 924. Such computer programs, when executed, may enable computer system 900 to implement the present methods as discussed herein. In particular, the computer programs, when executed, may enable processor device 904 to implement the methods illustrated by FIGS. 3, 4, 7, and 8, as discussed herein. Accordingly, such computer programs may represent controllers of the computer system 900. Where the present disclosure is implemented using software, the software may be stored in a computer program product and loaded into the computer system 900 using the removable storage drive 914, interface 920, and hard disk drive 912, or communications interface 924.

The processor device 904 may comprise one or more modules or engines configured to perform the functions of the computer system 900. Each of the modules or engines may be implemented using hardware and, in some instances, may also utilize software, such as corresponding to program code and/or programs stored in the main memory 908 or secondary memory 910. In such instances, program code may be compiled by the processor device 904 (e.g., by a compiling module or engine) prior to execution by the hardware of the computer system 900. For example, the program code may be source code written in a programming language that is translated into a lower level language, such as assembly language or machine code, for execution by the processor device 904 and/or any additional hardware components of the computer system 900. The process of compiling may include the use of lexical analysis, preprocessing, parsing, semantic analysis, syntax-directed translation, code generation, code optimization, and any other techniques that may be suitable for translation of program code into a lower level language suitable for controlling the computer system 900 to perform the functions disclosed herein. It will be apparent to persons having skill in the relevant art that such processes result in the computer system 900 being a specially configured computer system 900 uniquely programmed to perform the functions discussed above.

Techniques consistent with the present disclosure provide, among other features, systems and methods for facilitating installments for an electronic transaction. While various exemplary embodiments of the disclosed system and method have been described above it should be understood that they have been presented for purposes of example only, not limitations. It is not exhaustive and does not limit the disclosure to the precise form disclosed. Modifications and variations are possible in light of the above teachings or may be acquired from practicing of the disclosure, without departing from the breadth or scope.

What is claimed is:
1. A method for facilitation of installments for an electronic transaction, comprising:
 storing, in an account database of a processing server in an issuer computing system, an account profile, wherein the account profile includes a standardized data set related to a transaction account including at least an account identifier;
 receiving, by a receiving device of the processing server over a payment network from an acquirer computing device, a transaction message related to an electronic transaction involving the transaction account, wherein the transaction message is formatted based on one or more standards and includes a plurality of data elements including at least a first data element configured to store the account identifier, a second data element configured to store a transaction identifier, a third data element configured to store a transaction date, and a fourth data element configured to store a transaction amount;
 storing, in a record database of the processing server, a first transaction record, wherein the first transaction record includes a standardized data set related to the electronic transaction including at least the transaction identifier, the transaction amount, the transaction date, and a due date based on the transaction date;
 sending to a computing device associated with the transaction account, by a transmitting device of the processing server over a communication network when the transaction is approved, a data signal superimposed with an installment notification;
 receiving from the computing device associated with the transaction account, by the receiving device of the processing server over the communication network and in response to the installment notification, a data signal superimposed with an installment request, the installment request including at least data identifying the transaction account, the transaction identifier, and one or more installment options;
 calculating, by an installment calculation module of the processing server, one or more installment terms based on at least one of: the one or more installment options, the transaction amount, the transaction date, and the due date, wherein the one or more installment terms and/or one or more installment options includes at least an installment amount and a number of installments;
 generating, by an installment generation module of the processing server, a plurality of second transaction records, wherein each second transaction record includes a standardized data set related to an installment for the electronic transaction including at least the transaction identifier, the installment amount, and a payment date based on the due date and the number of installments, and wherein a number of transaction records in the plurality of second transaction records is equivalent to the number of installments;
 replacing, by an updating module of the processing server, the first transaction record stored in the record database with the generated plurality of second transaction records; and
 receiving, by the receiving device of the processing server, a second transaction message related to a second electronic transaction involving the transaction account from the payment network, wherein the second transaction message is formatted based on the one or more standards and includes a plurality of data elements including at least a first data element configured to store the account identifier, a second data element configured to store a second transaction identifier, a third data element configured to store a second transaction date, and a fourth data element configured to store a second transaction amount, wherein the installment request further includes the second transaction identifier.

2. The method of claim 1, further comprising:
electronically transmitting, by the transmitting device of the processing server, a data signal superimposed with a confirmation in response to the received data signal superimposed with the installment request, wherein the confirmation includes at least the calculated one or more installment terms.

3. The method of claim 1, wherein the data signal superimposed with the installment request is electronically transmitted by a management server associated with a payment network.

4. The method of claim 1, wherein the payment date included in each of the plurality of transaction records is a different date.

5. The method of claim 1, wherein
the account profile further includes an account balance, and
the processing server includes an account management module configured to deduct, for each of the plurality of transaction records, the installment amount from the account balance at the respective payment date.

6. The method of claim 1, wherein the installment amount is based on at least the transaction amount and the number of installments.

7. The method of claim 6, wherein a total of a product of the installment amount and the number of installments is greater than the transaction amount.

8. The method of claim 1, wherein the installment amount is based on at least a total of the transaction amount and the second transaction amount and the number of installments.

9. The method of claim 1, further comprising:
storing, in the record database of the processing server, a second transaction record, wherein the second transaction record includes a standardized data set related to the second electronic transaction including at least the second transaction identifier, the second transaction amount, the second transaction date, and a second due date based on the second transaction date, wherein
the replacing step further includes replacing the second transaction record.

10. A method for facilitation of installments for an electronic transaction, comprising:
storing, in an account database of a processing server in an issuer computing system, an account profile, wherein the account profile includes a standardized data set related to a transaction account including at least an account identifier;
receiving from an acquirer computing device, by a receiving device of the processing server over a payment network, a transaction message related to an electronic transaction involving the transaction account, wherein the transaction message is formatted based on one or more standards and includes a plurality of data elements including at least a first data element configured to store the account identifier, a second data element configured to store a transaction identifier, a third data element configured to store a transaction date, and a fourth data element configured to store a transaction amount;

storing, in a record database of the processing server, a first transaction record, wherein the first transaction record includes a standardized data set related to the electronic transaction including at least the transaction identifier, the transaction amount, the transaction date, and a due date based on the transaction date;

receiving, by the receiving device of the processing server over a communication network, a data signal superimposed with an installment request, the installment request including at least data identifying the transaction account, the transaction identifier, and one or more installment options;

calculating, by an installment calculation module of the processing server, one or more installment terms based on at least one of: the one or more installment options, the transaction amount, the transaction date, and the due date, wherein the one or more installment terms and/or the one or more installment options includes at least an installment amount and a number of installments;

generating, by an installment generation module of the processing server, a plurality of second transaction records, wherein each second transaction record includes a standardized data set related to an installment for the electronic transaction including at least the transaction identifier, the installment amount, and a payment date based on the due date and the number of installments, and wherein a number of transaction records in the plurality of second transaction records is equivalent to the number of installments;

replacing, by an updating module of the processing server, the first transaction record stored in the record database with the generated plurality of second transaction records; and electronically transmitting, by a transmitting device of the processing server over the communication network, a data signal superimposed with an installment notification to a mobile computing device associated with a specific device identifier, wherein the installment notification includes at least data identifying the transaction account, the transaction identifier, and at least one of the one or more installment options, wherein the data signal superimposed with the installment notification is electronically transmitted to the mobile computing device prior to receiving the data signal superimposed with the installment request, the data signal superimposed with the installment request is received from the mobile computing device associated with the specific device identifier, and the account profile further includes the specific device identifier.

11. A method for facilitation of installments for an electronic transaction, comprising,
storing, in an account database of a processing server in an issuer computing system, an account profile, wherein the account profile includes a standardized data set related to a transaction account including at least an account identifier;
receiving from an acquirer computing device, by a receiving device of the processing server over a payment network, a transaction message related to an electronic transaction involving the transaction account, wherein the transaction message is formatted based on one or more standards and includes a plurality of data elements including at least a first data element configured to store the account identifier, a second data element configured to store a transaction identifier, a third data element configured to store a transaction date, and a fourth data element configured to store a transaction amount;

storing, in a record database of the processing server, a first transaction record, wherein the first transaction record includes a standardized data set related to the electronic transaction including at least the transaction identifier, the transaction amount, the transaction date, and a due date based on the transaction date;

sending to a computing device associated with the transaction account, by a transmitting device of the processing server over a communication network when the transaction is approved, a data signal superimposed with an installment notification;

receiving from the computing device associated with the transaction account, by the receiving device of the processing server over the communication network and in response to the installment notification, a data signal superimposed with an installment request, the installment request including at least data identifying the transaction account, the transaction identifier, and one or more installment options;

calculating, by an installment calculation module of the processing server, one or more installment terms based on at least one of: the one or more installment options, the transaction amount, the transaction date, and the due date, wherein the one or more installment terms and/or the one or more installment options includes at least an installment amount and a number of installments;

generating, by an installment generation module of the processing server, a plurality of second transaction records, wherein each second transaction record includes a standardized data set related to an installment for the electronic transaction including at least the transaction identifier, the installment amount, and a payment date based on the due date and the number of installments, and wherein a number of transaction records in the plurality of second transaction records is equivalent to the number of installments; and replacing, by an updating module of the processing server, the first transaction record stored in the record database with the generated plurality of second transaction records, wherein the account profile further includes a linked account identifier associated with an alternative transaction account, and each of the plurality of transaction records further includes the linked account identifier.

12. The method of claim 11, wherein the transaction account is a debit account, and the alternative transaction account is a credit account.

13. A system for facilitation of installments for an electronic transaction, comprising:

an account database of a processing server in a computing system of an issuer configured to store an account profile, wherein the account profile includes a standardized data set related to a transaction account including at least an account identifier;

a receiving device of the processing server configured to receive from an acquirer computing device over a payment network a transaction message related to an electronic transaction involving the transaction account, wherein the transaction message is formatted based on one or more standards and includes a plurality of data elements including at least a first data element configured to store the account identifier, a second data element configured to store a transaction identifier, a third data element configured to store a transaction date, and a fourth data element configured to store a transaction amount;

a record database of the processing server configured to store a first transaction record, wherein the first transaction record includes a standardized data set related to the electronic transaction including at least the transaction identifier, the transaction amount, the transaction date, and a due date based on the transaction date; and an installment calculation module, an installment generation module, and an updating module of the processing server, wherein a transmitting device of the processing server configured to send to a computing device associated with the transaction account over a communication network, a data signal superimposed with an installment notification, when the transaction is approved;

the receiving device of the processing server is further configured to receive from the computing device associated with the transaction account and in response to the installment notification a data signal superimposed with an installment request, the installment request including at least data identifying the transaction account, the transaction identifier, and one or more installment options, the installment calculation module of the processing server is configured to calculate one or more installment terms based on at least one of: the one or more installment options, the transaction amount, the transaction date, and the due date, wherein the one or more installment terms and/or the one or more installment options includes at least an installment amount and a number of installments, the installment generation module of the processing server is configured to generate a plurality of second transaction records, wherein each second transaction record includes a standardized data set related to an installment for the electronic transaction including at least the transaction identifier, the installment amount, and a payment date based on the due date and the number of installments, and wherein a number of transaction records in the plurality of second transaction records is equivalent to the number of installments, the updating module of the processing server is configured to replace the first transaction record stored in the record database with the generated plurality of second transaction records, the receiving device of the processing server is further configured to receive a second transaction message related to a second electronic transaction involving the transaction account from the payment network, wherein the second transaction message is formatted based on the one or more standards and includes a plurality of data elements including at least a first data element configured to store the account identifier, a second data element configured to store a second transaction identifier, a third data element configured to store a second transaction date, and a fourth data element configured to store a second transaction amount, and the installment request further includes the second transaction identifier.

14. The system of claim 13, further comprising:

a transmitting device of the processing server configured to electronically transmit a data signal superimposed with a confirmation in response to the received data signal superimposed with the installment request, wherein the confirmation includes at least the calculated one or more installment terms.

15. The system of claim 13, wherein the data signal superimposed with the installment request is electronically transmitted by a management server associated with a payment network.

16. The system of claim 13, wherein the payment date included in each of the plurality of transaction records is a different date.

17. The system of claim 13, wherein
the account profile further includes an account balance, and
the processing server includes an account management module configured to deduct, for each of the plurality of transaction records, the installment amount from the account balance at the respective payment date.

18. The system of claim 13, wherein the installment amount is based on at least the transaction amount and the number of installments.

19. The system of claim 18, wherein a total of a product of the installment amount and the number of installments is greater than the transaction amount.

20. The system of claim 13, wherein the installment amount is based on at least a total of the transaction amount and the second transaction amount and the number of installments.

21. The system of claim 13, wherein
the record database of the processing server is further configured to store a second transaction record, wherein the transaction record includes a standardized data set related to the second electronic transaction including at least the second transaction identifier, the second transaction amount, the second transaction date, and a second due date based on the second transaction date, and
the updating module is further configured replace the second transaction record.

22. A system for facilitation of installments for an electronic transaction, comprising:
an account database of a processing server in a computing system of an issuer configured to store an account profile, wherein the account profile includes a standardized data set related to a transaction account including at least an account identifier;
a receiving device of the processing server configured to receive over a payment network from a computing device of an acquirer a transaction message related to an electronic transaction involving the transaction account, wherein the transaction message is formatted based on one or more standards and includes a plurality of data elements including at least a first data element configured to store the account identifier, a second data element configured to store a transaction identifier, a third data element configured to store a transaction date, and a fourth data element configured to store a transaction amount;
a record database of the processing server configured to store a first transaction record, wherein the first transaction record includes a standardized data set related to the electronic transaction including at least the transaction identifier, the transaction amount, the transaction date, and a due date based on the transaction date;
an installment calculation module, an installment generation module, and an updating module of the processing server; and a transmitting device of the processing server configured to electronically transmit a data signal superimposed with an installment notification to a mobile computing device associated with a specific device identifier, wherein the installment notification includes at least data identifying the transaction account, the transaction identifier, and at least one of the one or more installment options, wherein
the data signal superimposed with the installment notification is electronically transmitted to the mobile computing device over a communication network prior to receiving the data signal superimposed with the installment request,
the data signal superimposed with the installment request is received, over the communication network, from the mobile computing device associated with the specific device identifier,
the account profile further includes the specific device identifier,
the receiving device of the processing server is further configured to receive a data signal superimposed with an installment request, the installment request including at least data identifying the transaction account, the transaction identifier, and one or more installment options,
the installment calculation module of the processing server is configured to calculate one or more installment terms based on at least one of: the one or more installment options, the transaction amount, the transaction date, and the due date, wherein the one or more installment terms and/or the one or more installment options includes at least an installment amount and a number of installments,
the installment generation module of the processing server is configured to generate a plurality of second transaction records, wherein each second transaction record includes a standardized data set related to an installment for the electronic transaction including at least the transaction identifier, the installment amount, and a payment date based on the due date and the number of installments, and wherein a number of transaction records in the plurality of second transaction records is equivalent to the number of installments, and
the updating module of the processing server is configured to replace the first transaction record stored in the record database with the generated plurality of second transaction records.

23. A system for facilitation of installments for an electronic transaction, comprising:
an account database of a processing server in a computing system of an issuer, the processing server configured to store an account profile, wherein the account profile includes a standardized data set related to a transaction account including at least an account identifier;
a receiving device of the processing server configured to receive from a computing device of an acquirer over a payment network a transaction message related to an electronic transaction involving the transaction account, wherein the transaction message is formatted based on one or more standards and includes a plurality of data elements including at least a first data element configured to store the account identifier, a second data element configured to store a transaction identifier, a third data element configured to store a transaction date, and a fourth data element configured to store a transaction amount;

a record database of the processing server configured to store a first transaction record, wherein the first transaction record includes a standardized data set related to the electronic transaction including at least the transaction identifier, the transaction amount, the transaction date, and a due date based on the transaction date; and an installment calculation module, an installment generation module, and an updating module of the processing server, wherein the receiving device of the processing server is further configured to receive over a communication network a data signal superimposed with an installment request, the installment request including at least data identifying the transaction account, the transaction identifier, and one or more installment options, the installment calculation module of the processing server is configured to calculate one or more installment terms based on at least one of: the one or more installment options, the transaction amount, the transaction date, and the due date, wherein the one or more installment terms and/or the one or more installment options includes at least an installment amount and a number of installments, the installment generation module of the processing server is configured to generate a plurality of second transaction records, wherein each second transaction record includes a standardized data set related to an installment for the electronic transaction including at least the transaction identifier, the installment amount, and a payment date based on the due date and the number of installments, and wherein a number of transaction records in the plurality of transaction records is equivalent to the number of installments, the updating module of the processing server is configured to replace the first transaction record stored in the record database with the generated plurality of second transaction records, the account profile further includes a linked account identifier associated with an alternative transaction account, and each of the plurality of second transaction records further includes the linked account identifier.

24. The system of claim 23, wherein the transaction account is a debit account, and the alternative transaction account is a credit account.

\* \* \* \* \*